United States Patent
Utagawa et al.

(10) Patent No.: US 9,690,996 B2
(45) Date of Patent: Jun. 27, 2017

(54) ON-VEHICLE IMAGE PROCESSOR

(71) Applicant: Clarion Co., Ltd., Saitama-shi (JP)

(72) Inventors: Akira Utagawa, Hitachi (JP);
Masahiro Kiyohara, Tokyo (JP);
Takehito Ogata, Hitachi (JP); Satoshi Suzuki, Saitama (JP); Shoji Muramatsu, Hitachi (JP); Yasuhisa Hayakawa, Yokohama (JP); Osamu Fukata, Commerce Township, MI (US);
Akira Morimoto, Machida (JP)

(73) Assignee: Clarion Co., Ltd., Saitama-shi (JP)

( * ) Notice: Subject to any disclaimer, the term of this patent is extended or adjusted under 35 U.S.C. 154(b) by 185 days.

(21) Appl. No.: 14/647,822

(22) PCT Filed: Nov. 21, 2013

(86) PCT No.: PCT/JP2013/081368
§ 371 (c)(1),
(2) Date: May 27, 2015

(87) PCT Pub. No.: WO2014/084113
PCT Pub. Date: Jun. 5, 2014

(65) Prior Publication Data
US 2015/0339535 A1  Nov. 26, 2015

(30) Foreign Application Priority Data

Nov. 27, 2012  (JP) ................................ 2012-258696

(51) Int. Cl.
*H04N 7/00* (2011.01)
*G06K 9/00* (2006.01)
(Continued)

(52) U.S. Cl.
CPC ............ *G06K 9/00812* (2013.01); *B60R 1/00* (2013.01); *G06T 7/246* (2017.01); *G06T 7/73* (2017.01);
(Continued)

(58) Field of Classification Search
CPC ....... G06K 9/00812; G06T 7/246; G06T 7/73; G06T 2207/30256; G06T 2207/30264;
(Continued)

(56) References Cited

U.S. PATENT DOCUMENTS

| | | | |
|---|---|---|---|
| 2009/0207045 A1 | 8/2009 | Jung | |
| 2010/0185390 A1* | 7/2010 | Monde | ............... G01C 21/26 701/532 |
| 2011/0216194 A1* | 9/2011 | Kosaki | ............... H04N 7/18 348/148 |

FOREIGN PATENT DOCUMENTS

| | | |
|---|---|---|
| JP | 2002-094978 A | 3/2002 |
| JP | 2012-080497 A | 4/2012 |

(Continued)

OTHER PUBLICATIONS

International Search Report mail date Dec. 17, 2013 for PCT/JP2013/081368.
(Continued)

*Primary Examiner* — Allen Wong
(74) *Attorney, Agent, or Firm* — Locke Lord LLP

(57) ABSTRACT

An on-vehicle image processor includes an imager mounted on a vehicle, an image convertor and compositor that converts images imaged by the imager into overhead images, a white line candidate area detector that detects a white line candidate area estimated to constitute a parking frame, an endpoint position detector that detects positions of endpoints, a vehicle behavior measurer that measures a movement amount of the vehicle, an endpoint movement
(Continued)

position predictor that predicts moved positions of the endpoints detected by endpoint position detector, an endpoint movement amount judger, an endpoint position storage, a distance calculator that judges a degree of proximity of the endpoints, an information output device, an endpoint position oblivion judger that deletes the position of the endpoints satisfying a predetermined condition, a parking frame detector that detects a parking frame from the image, an accelerator opening degree detector and a vehicle behavior controller.

12 Claims, 15 Drawing Sheets

(51) Int. Cl.
  *B60R 1/00* (2006.01)
  *H04N 5/225* (2006.01)
  *G06T 7/73* (2017.01)
  *G06T 7/246* (2017.01)
(52) U.S. Cl.
  CPC .......... *H04N 5/225* (2013.01); *B60R 2300/10* (2013.01); *B60R 2300/307* (2013.01); *B60R 2300/806* (2013.01); *G06T 2207/30256* (2013.01); *G06T 2207/30264* (2013.01)
(58) Field of Classification Search
  CPC . B60R 1/00; B60R 2300/10; B60R 2300/307; B60R 2300/806; H04N 5/225
  USPC ........................................................ 348/118
  See application file for complete search history.

(56) References Cited

FOREIGN PATENT DOCUMENTS

JP    2012-166705 A    9/2012
JP    2012-175483 A    9/2012

OTHER PUBLICATIONS

Supplementary European Search Report dated Jun. 29, 2016, issued for the European patent application No. 13859040.1.

* cited by examiner

FIG.7C

| t | $t_0$ | $t_0+\Delta t$ | $t_0+2\Delta t$ | $t_0+3\Delta t$ | $t_0+4\Delta t$ |
|---|---|---|---|---|---|
| POSITIONAL RELATIONSHIP OF FIXING POINT AND ENDPOINT | | | | | |
| $C_v$ | 0 | 3 | 2 | 1 | 0 |
| $C_n$ | 0 | 0 | 0 | 0 | 1 |

FIG.9

| | 1 | 2 | 3 | 4 | 5 | 6 | 7 | 8 | 9 |
|---|---|---|---|---|---|---|---|---|---|
| | EFFECTIVE | MONITORING TIME | ACTUAL ENDPOINT POSITION | PREDICTED ENDPOINT POSITION | VEHICLE MOVEMENT DISTANCE | $C_v$ | $C_p$ | $C_s$ | $C_d$ |
| a | 1 | t0 | $(x_{11}, y_{11})$ | | | | | | |
| b | 1 | t0 | $(x_{12}, y_{13})$ | | | | | | |
| c | 1 | t0+$\Delta$t | $(x_{13}, y_{13})$ | $(f(x_{11}, K_1), f(y_{11}, K_1))$ | $K_1$ | | | | |
| d | 1 | t0+$\Delta$t | $(x_{14}, y_{14})$ | $(f(x_{12}, K_1), f(y_{12}, K_1))$ | $K_1$ | | | | |
| | ... | ... | ... | ... | ... | ... | ... | ... | ... |

CENTERLINE ID

| 1 | 2 | 3 | ... | N |
|---|---|---|---|---|

FIG.10

| FIXING POINT ID | | | | | | | |
|---|---|---|---|---|---|---|---|
| 1 | EFFECTIVE | DISTANCE FROM CLOSEST CENTER LINE | POSITION | $C_v$ | $C_p$ | $C_s$ | $C_d$ | $C_n$ |

| | 1 | 2 | 3 | 4 | 5 | 6 | 7 | 8 |
|---|---|---|---|---|---|---|---|---|
| a | 1 | $d_1$ | $(x_a, y_b)$ | .... | .... | .... | .... | .... |

Fixing Point ID list: 1, 2, 3, ... N (arrow from ID 1 to row a)

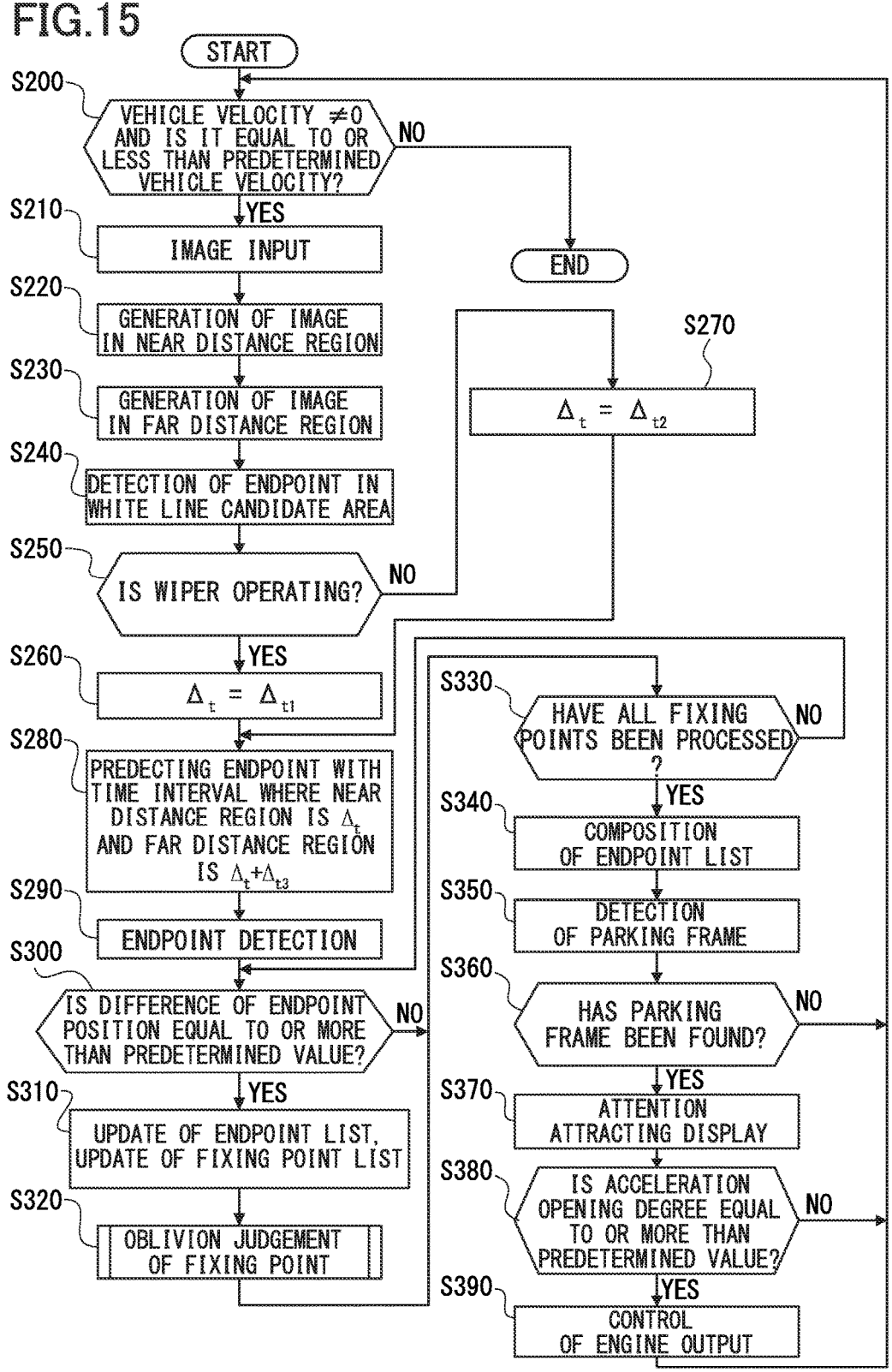

ON-VEHICLE IMAGE PROCESSOR

CROSS REFERENCE TO RELATED APPLICATIONS

This application is a U.S. National Phase Application, pursuant to 35 U.S.C. §371, of PCT International Application Serial No. PCT/JP2013/081368, filed Nov. 21, 2013, designating the United States and published on May 6, 2014 as publication WO 2014/084113 A1, which claims priority to Japanese Patent Application Serial No.: JP 2012-258696, filed Nov. 27, 2012, the entire contents of each of which are incorporated herein by reference.

TECHNICAL FIELD

The present invention relates to an on-vehicle image processor which detects a position of a parking frame drawn on a road surface by use of an on-vehicle camera.

BACKGROUND ART

In recent years, a device configured to assist parking operation has been studied and developed. The device monitors circumference of a vehicle by a camera mounted on the vehicle, detects a position of a parking frame sectioned by white or yellow lines drawn on a road surface from a monitored image, and calculates a relationship between the position of the vehicle and lanes based on the detected position of the parking frame.

In such a system, there is a high possibility that dirt is clung to a lens of the camera because the system is used in a state buffeted by the wind and the rain outdoors. The system is configured to detect the dirt of the lens and notify the detection to a driver, because, if the dirt is clung to the lens, a subject to be photographed cannot be essentially imaged (see, for example, Patent Literature 1).

CITATION LIST

Patent Literature

Patent Literature 1: Japanese Patent Application Publication No. 2012-166705

SUMMARY OF INVENTION

Technical Problem

In a foreign-object clinging determination device for an on-vehicle camera disclosed in Patent Literature 1, a predetermined long part is detected as a target and foreign objects clung to a lens are determined based on the detected state of the target.

However, in the invention disclosed in Patent Literature 1, since a foreign object clinging to the lens is determined on the basis of presence or absence of uniformity of a certain long target object, the dirt on the lens cannot be surely recognized unless a captured image contains as many characteristic points as possible including long white lines, a large number of parking frames, and road surface patterns of pedestrian crossings. if characteristic points such as long white lines, many parking frames, road surface patterns of a pedestrian crossing and so on are not contained in an image as imaged as much as possible, there is a problem that the dirt of the lens cannot be securely recognized, because the foreign objects clung to the lens are determined based on particular presence and absence of the predetermined long target part.

The present invention is made in view of the foregoing problems and it is an object of the present invention to provide an on-vehicle image processor capable of detecting a position of a parking frame drawn on a road surface without being influenced by dirt, even if the dirt is clung to a lens of a camera.

Solution to Problem

An on-vehicle image processor according to the present invention includes an imager mounted on a vehicle, monitoring circumference of the vehicle, and imaging images containing at least a road surface; a white line candidate area detector that detects a white line candidate area which is estimated to form a parking frame from the image imaged by the imager; an endpoint position detector that detects, from the detected white line candidate area, positions of two endpoints of a center line connecting middle points of lines connecting between each of positive edges in which a brightness of pixels close to a predetermined direction changes to be larger and brighter than a predetermined value and each of negative edges in which a brightness of pixels close to the predetermined direction changes to be larger and darker than a predetermined value, the negative edge being positioned in a predetermined distance from the positive edge; a vehicle behavior measurer that measures a behavior of the vehicle; an endpoint movement position predictor that predicts positions in the image where the positions of the two endpoints detected by the endpoint position detector are estimated to be moved during a predetermined time difference, based on a behavior of the vehicle measured by the vehicle behavior measurer; an endpoint movement amount judger that obtains a difference between the positions of the endpoints predicted by the endpoint movement position predictor and the positions of the endpoints detected by the endpoint position detector and judges whether the difference is larger than a predetermined value; an endpoint position storage that stores the positions of endpoints when it is judged in the endpoint movement amount judger that the difference of the positions of the endpoints is larger than the predetermined value; a parking frame detector that detects a parking frame based on a position of the white line candidate area; and a distance calculator that calculates a distance between the positions of the endpoints detected by the endpoint position detector or line elements having the endpoints and the positions of the endpoints stored in the endpoint position storage. When the distance detected by the distance calculator is smaller than a predetermined value, the parking frame detector reduces a degree of contribution of the white line candidate area containing the endpoints detected by the endpoint position detector when the parking frame detector executes the detection of the parking frame.

In the on-vehicle image processor according to the present invention configured as described above, the imager mounted on the vehicle images the image containing at least the road surface around the vehicle, the white line candidate area detector detects the white line candidate area capable of constituting the parking frame from the imaged image, and the endpoint position detector detects from the thus detected white line candidate area, as the endpoints of the white line candidate area, the positions of the two endpoints of the center line connecting middle points of a line connecting between a positive edge in which a brightness of a pixel close to a predetermined direction changes to be brighter and larger than a predetermined value and a negative edge in which a brightness of a pixel close to a predetermined direction changes to be darker and larger than a predetermined value, the negative edge being positioned in a predetermined distance from the positive edge.

The endpoint movement position predictor predicts positions in the image where the positions of the two endpoints detected by the endpoint position detector in the image are estimated to be moved during a predetermined time difference, and the endpoint movement amount judger obtains a difference between the positions of the endpoints predicted by the endpoint movement position predictor and the positions of the endpoints actually detected by the endpoint position detector at the time when a predetermined time difference elapses.

When the difference is larger than a predetermined value, the endpoint position storage stores the positions before the endpoints move, the parking frame detector reduces a degree of contribution of the white line candidate area where it is judged in the distance calculator that the endpoints of the white line candidate area or line elements having the endpoints are in a predetermined distance from the positions of the endpoints stored in the endpoint position storage, and the parking frame is detected based on a size of the parking frame predicted to be monitored in the image. Therefore, even if the dirt is clung to the imager and a break is generated in the white line candidate area, it is possible to stably and securely detect the position of the parking frame drawn on the road surface.

Effect of the Invention

In the on-vehicle image processor according to the present invention, even if dirt is clung to a lens of a camera, it is possible to stably and securely detect a position of a parking frame drawn on a road surface without being influenced by the dirt.

BRIEF DESCRIPTION OF DRAWINGS

FIG. 7C is a table explaining procedure executing the oblivion of the fixing point based on a vehicle condition.

FIG. 9 is a table explaining a content of an endpoint list.

FIG. 10 is a table explaining a content of a fixing point list.

FIG. 15 is a flowchart explaining a flow of processing of Embodiment 2 according to the present invention.

DESCRIPTION OF EMBODIMENTS

Embodiments of an on-vehicle image processor according to the present invention will be described with reference to the accompanying drawings. In the following description, a contrast value contained in an image is referred to as brightness value. In addition, a brightness value of a pixel (x, y) of an image I is represented by I(x, y).

Embodiment 1

A first embodiment is an example in which the on-vehicle image processor according to the present invention is applied to a system that prevents a vehicle from starting suddenly by so-called pedal stepping error which occurs when a vehicle suddenly starts with an unexpected timing by a driver's incorrectly pressing an accelerator pedal instead of a brake pedal in a parking operation in a parking lot where a parking frame is drawn on a road surface.

Figure 1:
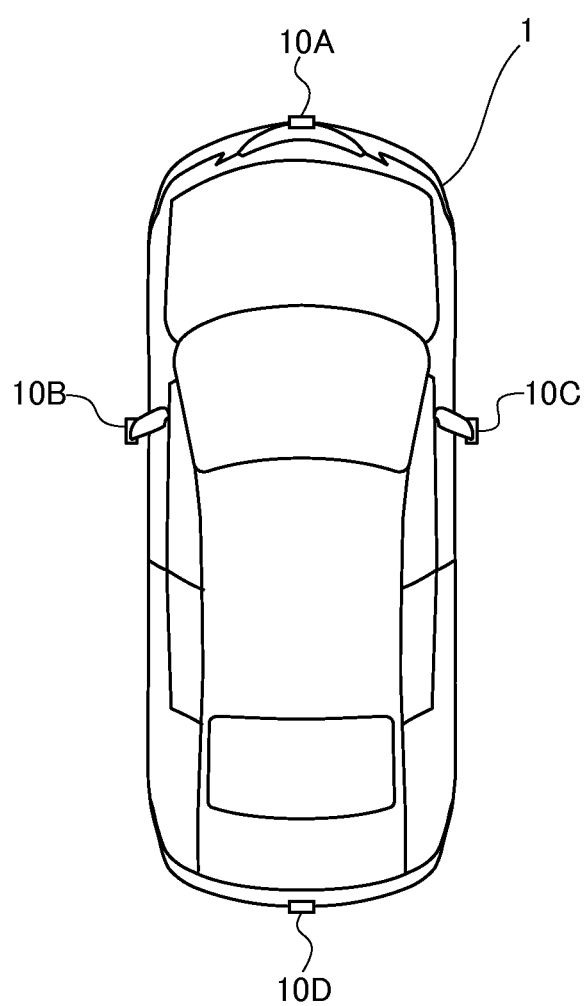
FIG. 1 is a view explaining a vehicle on which Embodiment 1 of an on-vehicle image processor according to the present invention is mounted.

A configuration of the on-vehicle image processor is first described with reference to FIGS. 1 to 3. The on-vehicle image processor is mounted on the vehicle 1 and includes a front camera 10A which images a front side of the vehicle 1, a left camera 10B attached to a left door mirror of the vehicle 1 to image a left side of the vehicle 1, a right camera 10C attached to a right door mirror of the vehicle 1 to image a right side of the vehicle 1, and a rear camera 10D which images a rear side of the vehicle 1, as shown in FIG. 1. An imager 10 composed of the four cameras is configured to be capable of monitoring the road surface around the vehicle 1. Each of the cameras includes an optical system having lenses having light condensing function and a photoelectric converting element such as a CMOS and so on.

Figure 2:
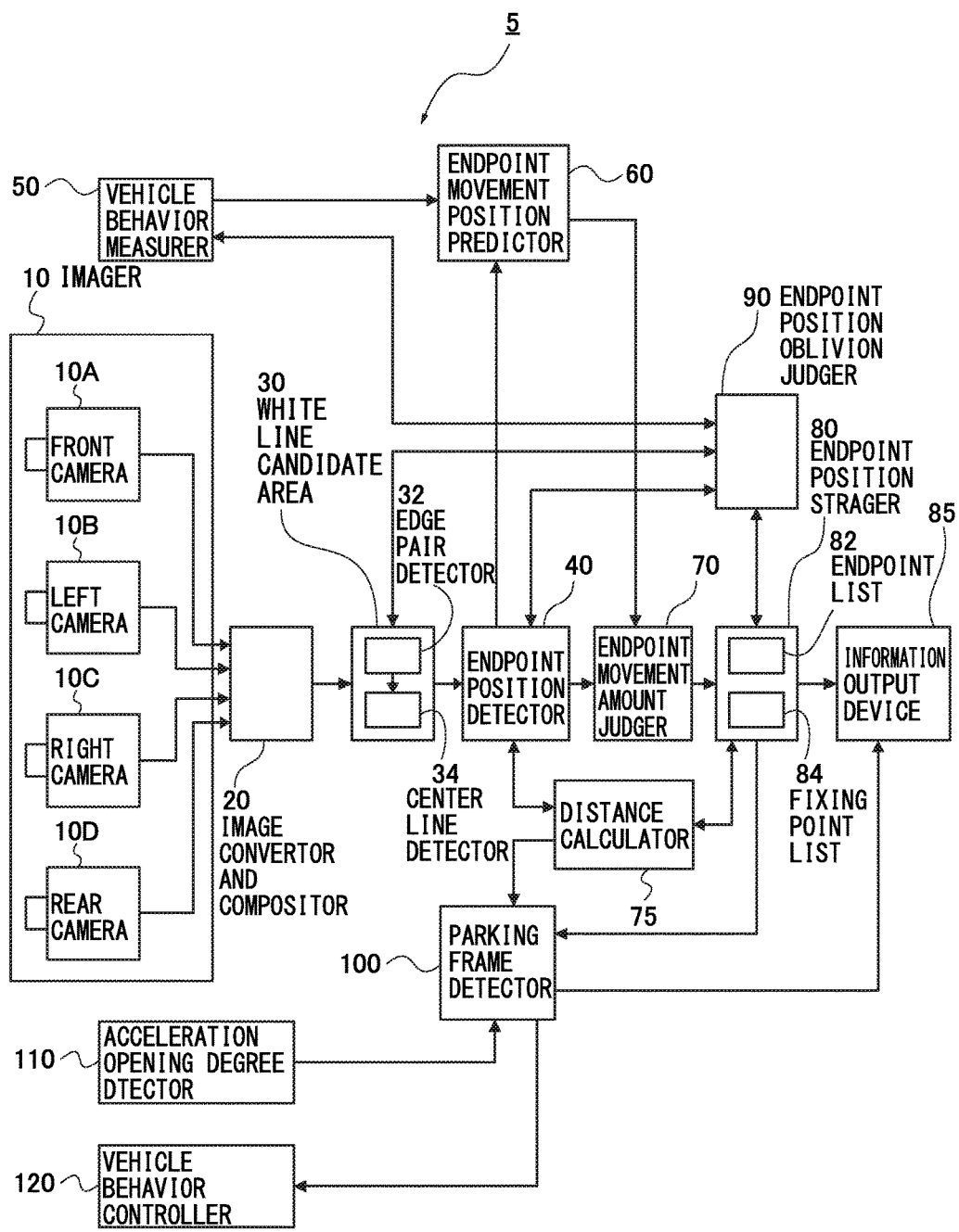
FIG. 2 is a block diagram of the entire configuration of Embodiment 1 according to the present invention.
Figure 3:
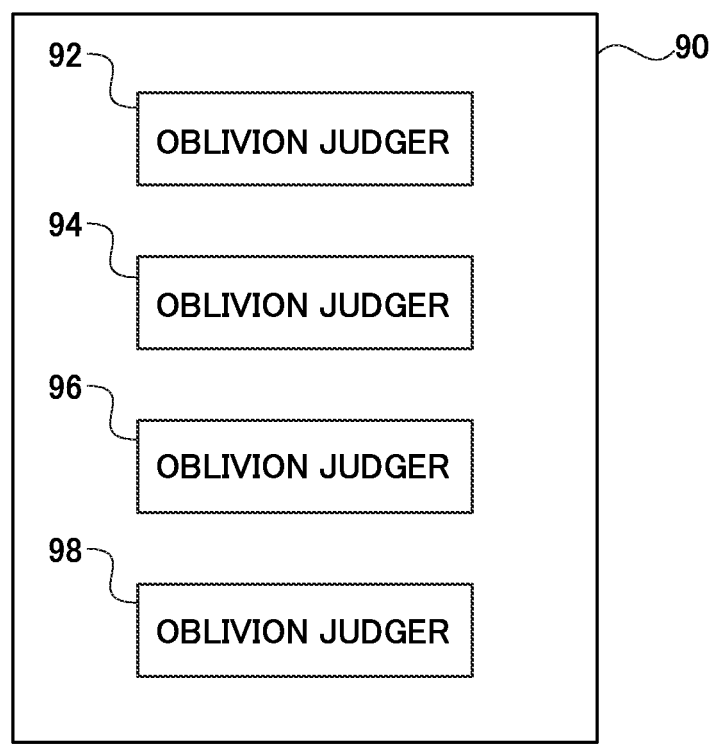
FIG. 3 is a block diagram showing a detailed configuration of an endpoint position oblivion judger in Embodiment 1 according to the present invention.

FIG. 2 is a block diagram showing an entire configuration of Embodiment 1. The on-vehicle image processor 5 includes the imager 10 mounted on the vehicle 1 (see FIG. 1), an image convertor and compositor 20, a white line candidate area detector 30, an endpoint position detector 40, a vehicle behavior measurer 50, an endpoint movement position predictor 60, an endpoint movement amount judger 70, an endpoint position storage 80, a distance calculator 75, an information output device 85, an endpoint position oblivion judger 90, a parking frame detector 100, an accelerator opening degree detector 110 and a vehicle behavior controller 120. The imager images areas containing the road surface at circumference of the vehicle 1. The imager is composed of the front camera 10A, the left camera 10B, the right camera 10C and the rear camera 10D. The image converter and compositor executes coordinate conversion of images imaged by the front, left, right and rear cameras into overhead images as overlooked at the vehicle from above and synthesizes them into a single image. The white line candidate area detector detects white line candidate area(s) which is estimated to form a parking frame from the image synthesized by the image converter and compositor.

The endpoint position detector 40 detects positions of two endpoints which are opposite ends of a center line connecting middle points of a line connecting a positive edge in which brightness brightly changes and a negative edge in which brightness darkly changes, in which the edges are detected when referring to a brightness value of images in the detected white line candidate area along a predetermined direction (for example, a direction from left to right horizontally). The vehicle behavior measurer measures a movement amount of the vehicle 1 based on a vehicle velocity and a steering angle of the vehicle. The endpoint movement position predictor predicts positions in the image, where the positions of the two endpoints detected by the endpoint position detector 40 are estimated to be moved, based on a behavior of the vehicle 1, measured by the vehicle behavior measurer 50. The endpoint movement amount judger 70 obtains a difference between the positions (hereinafter referred to as predicting endpoint positions) of the two endpoints predicted by the endpoint movement position predictor 60 and the positions (hereinafter referred to as actual endpoint positions) of the two endpoints detected by the endpoint position detector 40 and judges a magnification of the difference.

The endpoint position storage stores positions of endpoints in which it is judged that the difference is large and a vehicle behavior at that time and so on. The distance calculator calculates a distance between the positions of the endpoints stored in the endpoint position storage 80 and the positions of the endpoints detected by the endpoint position detector 40 and determines a degree of proximity between both the endpoints. The information output device is composed of a display, a voice output apparatus and so on configured to notify that the parking frame is detected, or a control restraining an engine output is performed, to the driver of the vehicle 1. The endpoint position oblivion judger deletes the positions of the endpoints, when the stored positions of the endpoints satisfy a predetermined condition. The parking frame detector detects the parking frame from the image. The accelerator opening degree detector detects an accelerator opening degree of the vehicle 1. The vehicle behavior controller restrains the engine output of the vehicle 1 and prevents the vehicle 1 from being started suddenly, when the parking frame is detected by the parking frame detector 100 and an accelerator opening degree larger than the predetermined value is detected.

The white line candidate area detector 30 further includes an edge pair detector 32 that detects a pair of positive and negative edges adjacent to each other in a predetermined direction (for example, from left to right in the image horizontally), and a center line detector 34 that detects a center line formed by a line connecting middle points of lines connecting the positive edges and the negative edges in each of the pairs of positive and negative edges.

The endpoint position storage 80 further includes an endpoint list 82 in which the positions of the end points detected by the endpoint position detector 40 are stored and updated in accordance with operation of the on-vehicle image processor 5, and a fixing point list 84 in which a position 8 (s) (hereinafter referred to as fixing point(s) Q) of an endpoint(s) where a movement amount of the vehicle 1 is small), of the positions of the endpoints detected by the endpoint position detector 40, is stored and updated in accordance with the operation of the on-vehicle image processor 5.

The endpoint position oblivion judger 90 further includes an oblivion judger 92 based on a vehicle velocity condition that executes oblivion judgement of the fixing point Q in accordance with the vehicle velocity, an oblivion judger 94 based on the positions of the endpoints that execute oblivion judgement of the fixing point Q in accordance with the positions of the endpoints constituting the white line candidate area, in the image, an oblivion judger 96 based on a direction of the center line, that executes oblivion judgement of the fixing point Q in accordance with the direction where the center line constituting the white line candidate area extends and an oblivion judger 98 based on a length of a perpendicular line, that executes oblivion judgement of the fixing point Q in accordance with the length of the perpendicular line down to the center line constituting the white line candidate area.

A summary of operation of Embodiment 1 is described hereinafter in order. In Embodiment 1, the white line candidate area estimated to represent the parking frame is first detected from the images imaged by the imager 10. Then, the positions of endpoints of the detected white line candidate area are obtained as representative points of the white line candidate area. The vehicle 1 moves at any time by an amount in accordance with the driver's operation in the parking lot, positions of the endpoints detected in accordance with the movement of the vehicle are moved in the images at any time. Then, the movement amount of the positions can be predicted based on the behavior of the vehicle 1.

At this time, if dirt due to mud, water droplet and so on is clung to the imager 10, the white line candidate area is not imaged in an area where the dirt is clung. Therefore, the white line candidate area is divided at boundary lines of the dirt. Then, the divided positions are detected as the positions of the endpoints as mentioned above.

Because it is considered that the position of the dirt does not move as a time elapses, a position of an endpoint divided by the dirt takes a way of moving different from the endpoints of the white line candidate area detected on the road surface, when the vehicle 1 moves. The endpoint is referred to as the fixing point Q. Accordingly, an endpoint performing movement against a prediction is estimated to be the fixing point Q which has occurred by the division of the white line candidate area by the dirt.

In Embodiment 1, the fixing point Q is detected and the white line candidate area having the detected fixing point Q as the endpoint is not used for the detection of the parking frame. Thereby, the parking frame is securely detected.

Moreover, Embodiment 1 has, when positions of the appeared fixing points Q are continuously monitored to satisfy a predetermined condition, a function of oblivioning the fixing points Q. Thereby, the number of the fixing points Q increases as a time elapses and the white line candidate area necessary essentially for constituting elements of the parking frame is deleted, thereby enabling preventing the parking frame from being not detected.

Next, contents of important parts of the summary of operation in Embodiment 1 as described above are described.

<Description of Method of Detecting White Line Candidate Area(s)>

A method of detecting the white line candidate area executed in the white line candidate area detector 30 is first described with reference to FIGS. 4A and 4B.

Figure 4A:
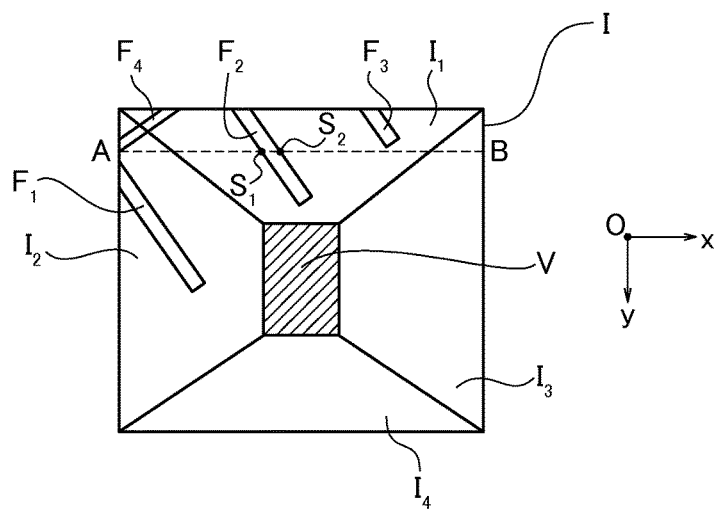
FIG. 4A is a diagram showing one example of an image imaged in Embodiment 1 according to the present invention.

FIG. 4A shows a synthesized image I. An image $I_1$ captured by the front camera 10A, an image $I_2$ captured by the left camera 10B, an image $I_3$ captured by the right camera 10C, and an image $I_4$ captured by the rear camera 10D are converted into overhead images of the vehicle 1 as overlooked from right above and synthesized into the single image I by the image converter and compositor 20.

The image I is formed by synthesizing the overhead images $I_1$, $I_2$, $I_3$, $I_4$ around a region V corresponding to the position of the vehicle 1, as shown in FIG. 4A. Since the image I is of the vehicle 1 or the road surface viewed from right above, white lines $F_1$, $F_2$, and $F_3$ drawn on the right and left sides of the vehicle and extending in a vehicle front-back direction, appear to be parallel to each other in the image I. Further, another white line $F_4$ extending in a width direction of the vehicle appears to be orthogonal to the white lines $F_1$, $F_2$, $F_3$.

A processing in which the image captured by the imager 10 is converted into the overhead images and synthesized into a single image is in practical use and known as a vehicle circumference monitoring system. Therefore, a detailed description of the processing is omitted.

The horizontal direction of the generated image I is defined to be x and the vertical direction thereof is defined to be y, and the upper left of the vehicle is defined to be original point (0, 0). Then, the white line candidate area detector 30 (FIG. 2) refers to the brightness value I(x, y) contained in the image I horizontally from left to right (certain direction) and calculates a difference in brightness values I(x, y) of two adjacent pixels. For the referred pixel (x, y) of the image I, a brightness difference I(x−1, y)−I(x, y) and a brightness difference I(x, y)−I(x+1, y) are calculated with respect to all the pixels in the image I in series.

Then, the white line candidate area detector 30 detects as a first pixel a pixel where a brightness value varies to be larger and brighter than a predetermined value, that is, a pixel satisfying I(x, y)−I(x−1, y)>$I_{th}$ relative to a predetermined brightness difference threshold $I_{th}$. The first pixel is referred to as positive edge.

Moreover, the white line candidate area detector 30 detects as a second pixel a pixel where a brightness value varies largely and darkly than a predetermined value, that is, a value satisfying I(x, y)−I(x+1, y)>$I_{th}$. The second pixel is referred to as negative edge.

If the pixels are of a white line forming a parking frame, an interval between the pixels as the positive edges (boundary point between the white line and the road surface) and the pixels as the negative edges (boundary point between the white line and the road surface) is approximately equal to the width of the white lines forming the parking frame. Therefore, when an interval w between a pixel as a positive edge and a pixel as a negative edge detected adjacent to the positive edge, which are detected from the image I is within a predetermined distance along a first direction, it is judged that there is a high possibility that the positive edge pixel and the negative edge pixel are white lines constituting the parking frame. Thus, these pixels are detected.

Figure 4B:
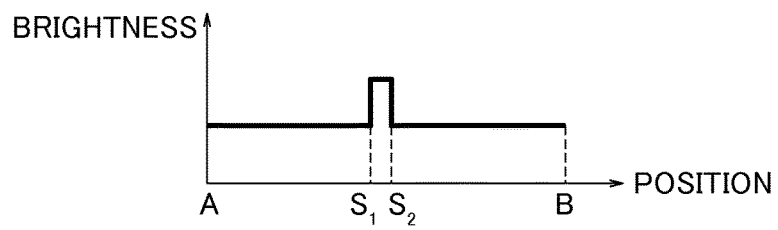
FIG. 4B is a graph showing a brightness distribution on a line A-B in the image of FIG. 4A

For example, when the brightness value contained in the image I is referred from the point A to the point B in FIG. 4A, a pixel $S_1$ is detected as the positive edge and a pixel $S_2$ is detected as the negative edge as shown in FIG. 4B.

A pair of the thus detected positive edge pixel $S_1$ and the negative edge pixel $S_2$ is referred to as an edge pair.

Pixels having the high brightness sandwiched between the thus detected edge pairs are formed on areas arranged continuously in an upward and downward direction of the image. That is to say, the edge pairs are continuously detected in the second direction perpendicular to the first direction. The thus formed areas are referred to as white line candidate area. Then, labeling processing is carried out on the detected white candidate area and a serial number is attached to each of the white line candidate areas.

<Description of Method of Detecting Endpoints of White Line Candidate Area(s)>

Figure 5:
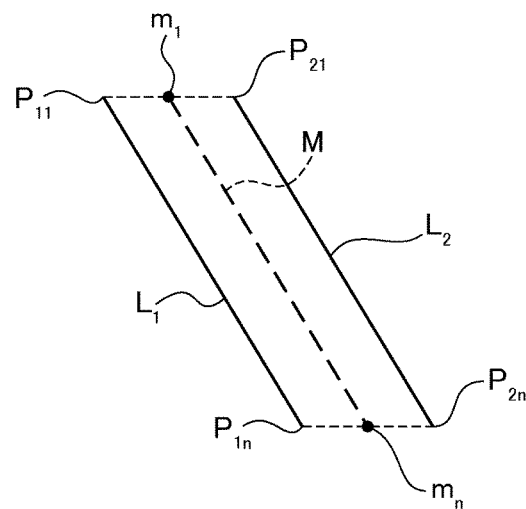
FIG. 5 is an explanatory view explaining a configuration of a detected white line candidate area(s).

Next, a method of detecting the endpoints from the detected white line candidate area is described. In the center line detector 34 (see FIG. 2), centerlines of a white line candidate area boundary line $L_1$ which is an assembly of pixels constituting the positive edge and a white line candidate area boundary line $L_2$ which is an assembly of pixels constituting the negative edge are detected. Thereby, a pixel $m_1$ as a middle point between the pixel $P_{11}$ which constitutes the positive edge and the pixel $P_{21}$ which constitutes the negative edge and forms the edge pair with the pixel $P_{11}$ is detected, as shown in FIG. 5. In addition, similarly, a pixel $m_n$ as a middle point between the pixel $P_{1n}$ which constitutes the positive edge and the pixel $P_{2n}$ which constitutes the negative edge is detected. In this way, a line connecting the pixel $m_1$ and the pixel $m_n$ is formed as a center line M of the white line candidate area. In addition, the endpoints of the center line M are set as the endpoint of the white line candidate area. In this case, the pixels $m_1$ and $m_n$ are the endpoints of the center line M, respectively.

Note that, actually, not only the pixels $m_1$ and $m_n$ which are the endpoints but also middle points of pixels forming more edge pairs are detected from one white line candidate area, and middle points of them are connected to be the center line M.

<Description of Methods of Predicting Movement Amount of Endpoints and of Judging the Movement Amount>

Next, a method of predicting a direction and a movement amount where the endpoints detected in this way move as a time elapses and a method of judging a comparison between the predicted movement amount and an actual movement amount are described.

Figure 6A:
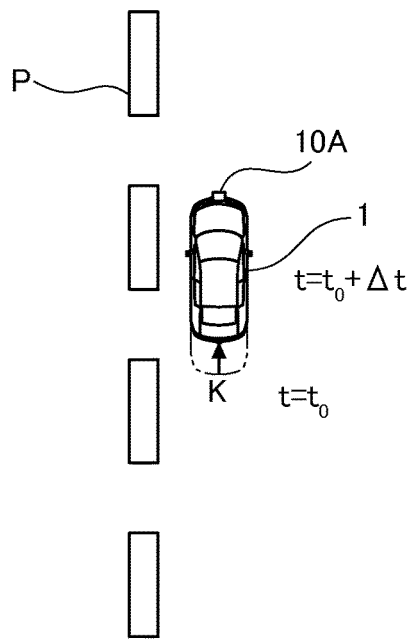
FIG. 6A is an explanatory view explaining movement of endpoints of the white line candidate area according to movement of the vehicle, and showing a state where vehicle is running on a side of a white line drawn in a dotted line-like shape.

FIG. 6A is a view illustrating a state where the vehicle is running a side of a dotted line-shaped white line P. FIG. 6A illustrates that the vehicle 1 forwardly moves by a movement amount K in a time difference $\Delta_t$ from a time t=$t_0$.

Figure 6B:
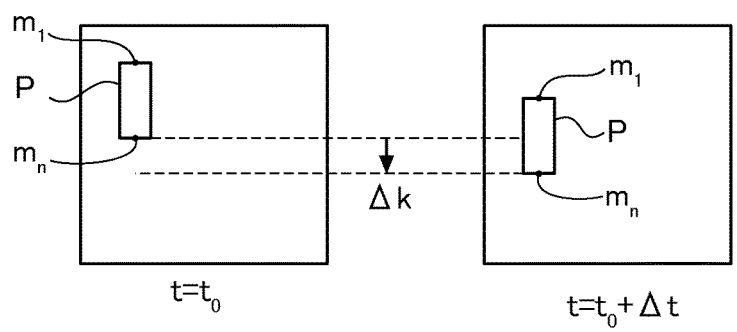
FIG. 6B is an explanatory view explaining a pattern where the white line monitored from the vehicle of FIG. 6A moves during a time difference $\Delta_t$.

At this time, in the time t=$t_0$, an image showing at a left side of FIG. 6B is imaged. Then, in the time t=$t_0$+$\Delta_t$, an image showing at a right side of FIG. 6B. At this time, among the pixels $m_{1n}$ and $m_n$ as the endpoints of the white line P appearing on the image, the pixel $m_n$ as the lower endpoint moves downward by a movement amount $\Delta_k$ pixel in the image.

Note that the movement amount $\Delta_k$ can be predicted by use of a vehicle velocity or steering angle measured by the vehicle behavior measurer 50. In other words, a distance where the vehicle is moved in the time difference $\Delta_t$ is acquired from a velocity of the vehicle for the time difference $\Delta_t$. Then, it is calculated how many pixels of the image of the vehicle 1 viewed from above imaged by the front camera 10A the calculated distance corresponds to, with taking a direction of movement of the vehicle 1 calculated based on the steering angle of the vehicle 1 into account. Thereby, it is possible to predict in which direction and by what number of pixels the positions of the endpoints are moved in the image I.

Figure 6C:
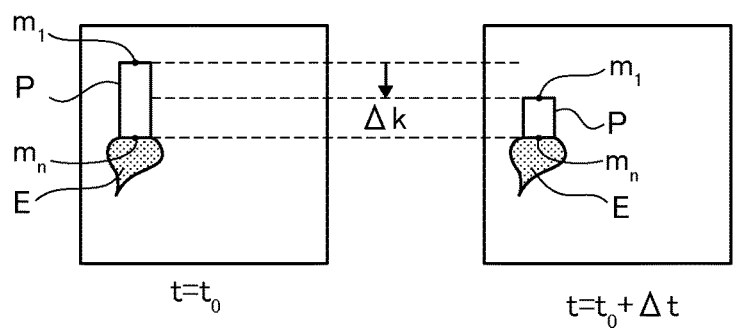
FIG. 6C is an explanatory view explaining a moving pattern of the white line when dirt is clung to an imager.

At this time, when dirt is clung to a surface of the lens of the front camera 10A, the positions of the endpoints present a movement pattern different from the movement pattern described in FIG. 6B, as shown in FIG. 6C.

That is to say, when the dirt is clung to the surface of the lens of the front camera 10A, the image showing at the left side of FIG. 6C is imaged in the time $t=t_0$. A dirty area(s) E is generated in the image as imaged by the dirt clung to the lens. The pixel $m_n$ which is the endpoint in a near side (lower side in the image) of the white line P is observed at an intersection of the white line P and the dirty area E.

Then, at the time $t=t_0+\Delta_t$, the image on the right side of FIG. 6C is captured. At this time, among the pixels $m_1$ and $m_n$ which are the endpoints of the white line P appearing on the image, the pixel $m_1$ as the upper endpoint moves downward by the movement amount $\Delta_k$ pixel. Meanwhile the pixel $m_n$ as the lower endpoint is not moved downward by the movement amount $\Delta_k$ pixel in the image but monitored at the position where the white line P is divided by the dirty area E. That is to say, the position of the pixel $m_n$ of the endpoint is approximately equal to the position at the time $t=t_0$. In this way, when the vehicle 1 is moved and the movement amount of the endpoint is smaller than a predicted movement amount, the endpoint is determined to be the fixing point Q as described above.

In this way, by comparing the movement amount of predicted endpoints based on the behavior of the vehicle 1 with the actually moved positions of the endpoints, it is possible to determine whether the endpoints are divided by the dirty area E, that is to say, the endpoints are the fixing points Q.

Note that, if the velocity of the vehicle 1 is high, the movement amount of the endpoints is large. Therefore, in the vehicle behavior measurer 50, if it is detected that the velocity of the vehicle 1 is higher than a predetermined value, the movement amount of the endpoints is evaluated by executing the calculations of the predicted endpoint positions and the actual endpoint positions without waiting the lapse of the time difference $\Delta_t$. Thereby, even if the velocity of the vehicle 1 is high, it is possible to further securely execute the determination as to whether the fixing point Q is generated because the positions of the endpoints of the white line candidate area can be correctly detected.

In addition, even if the velocity of the vehicle 1 is low, when a direction of the vehicle 1 is changed by the steering, the positions of the endpoints are largely moved. Therefore, before the time difference $\Delta_t$ elapses, even when the actual endpoint positions move the predetermined pixel or more in the image, the calculations of the predicted endpoint positions and the actual endpoint positions are executed at that time. Thereby, even if the direction of the vehicle 1 is largely changed in a short time, it is possible to further securely execute the determination as to whether the fixing point Q is generated because the positions of the endpoints of the white line candidate area can be correctly detected.

<Description of Method of Judging Oblivion of Fixing Points>

If the position of the thus detected fixing point Q is stored and the detected center line M is in a position close to the fixing point Q, it is estimated that the center line M is divided by the dirty area E. Accordingly, when using the white line candidate area involving the center line M for the detection of the parking frame, because the white line candidate area is not one completely detected, handling lowering a degree of contribution at the time of detecting the parking frame is made. A detailed content is described hereinafter.

By the way, when the foregoing image processing is continuously executed, if the dirt is clung to the lens of the imager 10, there is possibility that the fixing point Q to be detected increases with time. If the fixing point Q is increased, it is necessary to oblivion the fixing point Q previously stored, because there is a fear that the essentially required white line candidate area is also deleted.

In addition, of the dirt, there is water droplet clung to the lens, which is deleted as a time elapses. Therefore, the fixing point Q which is stored in the past must be appropriately oblivioned.

Figure 7A:
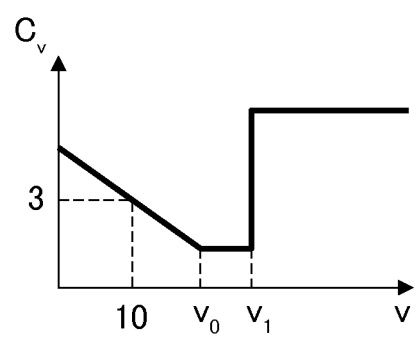
FIG. 7A is a graph explaining a method of executing an oblivion judgement of a fixing point(s) and showing a setting example of a center line monitoring number counter according to a vehicle velocity.
Figure 7B:
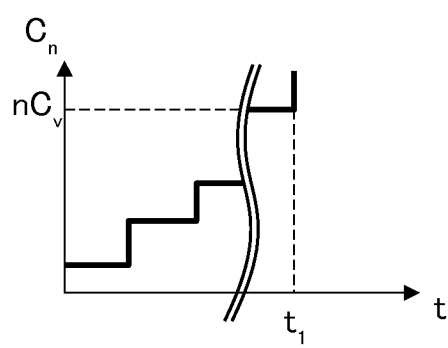
FIG. 7B is a graph showing a setting example of an oblivion counter of the fixing point.

Next, a method of judging the oblivion of the fixing point Q is described. FIGS. 7A to 7C are graphs explaining the method of oblivioning the fixing point Q based on a velocity of the vehicle 1. FIG. 7A shows a setting example of a center line monitoring number counter $C_v$ set in accordance with a velocity of the vehicle 1, and FIG. 7B shows a setting example of an oblivion judging counter $C_n$ of the fixing point Q. FIG. 7C shows a processing of executing the oblivion of the fixing point Q. A description is made hereinafter.

A column of the time $t=t_0$ in FIG. 7C represents that the center line M of the white line candidate area having the pixels $m_1$ and $m_n$ which are the endpoints at a position close to the fixing point Q which are detected in the past and stored is detected. Here, an area R having a radius $\Delta_d$ is set on a circumference of the pixel $m_n$ which is the endpoint of the center line M.

A column of the time $t=t_0+\Delta_t$ in FIG. 7C represents that the center line M is downward moved after the time difference $\Delta_t$ second. A this time, because the fixing point Q is in an inner portion of the area R around the pixel $m_n$ which is the endpoint of the center line M, a determination as to whether the fixing point Q is oblivioned is initiated, assuming that the white candidate areas are monitored close to the fixing point Q. Note that the position of the fixing point Q in the inner portion of the area R around the pixel $m_n$ which is the endpoint of the center line M is judged in the distance calculator 75.

The determination as to whether the fixing point Q is oblivioned is executed by use of two kinds of counters. One of them is the center line monitoring number counter $C_v$, which counts a number where the center line is monitored on a position close to the fixing point Q. The other is the oblivion judging counter $C_n$ which judges the oblivion of the fixing point Q by accumulating the count number of the center line monitoring number counter $C_v$.

FIG. 7C illustrates an operation example in which it is detected that a velocity of the vehicle 1 is 10 km per time in the vehicle behavior measurer 50, when the endpoint of the center line M is detected at the position close to the fixing point Q, and the center line monitoring number counter $C_v$ is set to 3 based on the setting example of the center line monitoring number counter $C_v$ shown in FIG. 7A.

Then, the center line monitoring number counter $C_v$ is decremented (see the columns of the time $t=t_0+2\Delta_t$, the time $t=t_0+3\Delta_t$ and the time $t=t_0+4\Delta_t$ in FIG. 7C) every time a state (referred to as oblivion condition) where the endpoint of the center line M is detected close to the fixing point Q is continued.

Then, when the center line monitoring number counter $C_v$ becomes 0, the oblivion judging counter $C_n$ is incremented (see the column of the time $t=t_0+4\Delta_t$ in FIG. 7C).

Thereafter, the similar operation is repeated, the fixing point Q is olivioned when the center line monitoring number counter $C_v$ turns n cycles, in other words, when the value of the oblivion judging counter $C_n$ becomes $3_n$. That is to say, the oblivion judging counter $C_n$ is a counter which counts an accumulated time generated by the oblivion condition.

Note that, by sudden noise being mixed, because there is a case that the endpoint of the center line M is not detected close to the fixing point Q, the decrement of the center line monitoring number counter $C_v$ is kept during the judging of the oblivion in the case that the endpoint of the center line M is not detected close to the fixing point Q, and the kept decrement is restarted when the endpoint of the center line M is detected close to the fixing point Q.

FIG. 7A shows the setting example of the aforementioned the center line monitoring number counter $C_v$. In the setting example, a setting value is adapted to be small as a velocity v of the vehicle 1 increases. This is because the fixing point Q is easy to oblivion when it is confirmed that the endpoint passages a neighborhood of the fixing point Q at the time of a high velocity of the vehicle, for a high possibility that the dirt already disappears when the endpoint passages the neighborhood of the fixing point Q.

In particular, if the broken line-shaped white line candidate area passages the neighborhood of the fixing point Q, it is effective to execute the setting of the center line monitoring number counter $C_v$ according to the vehicle velocity. Because the decrement of the center line monitoring number counter $C_v$ is the worst and only once, at the time of a high vehicle velocity, if the center line monitoring number counter $C_v$ is not set according to the vehicle velocity, there is possibility that the fixing point Q is not oblivioned even if the vehicle runs on a broken lined-road surface.

When setting the center line monitoring number counter $C_v$ in broken line-shaped white line candidate area, whether taking over the counter value of the center line monitoring number counter $C_v$ according to an interval of the broken line with respect to the broken line of a predetermined length may be set. For example, if the next broken line is monitored with a broader interval to a length of the broken line, the previous counter value is clear and the counter value can be reset based on the present vehicle velocity.

Furthermore, when the vehicle velocity exceeds a predetermined value v1, the setting value of the center line monitoring number counter $C_v$ is set to a predetermined high constant value. This is because the fixing point Q does not hardly oblivion for the generation of dirt which has a high adhesion and does not disappear even if the vehicle velocity is high, although dirt having fluidity as rain droplet is brown away by wind pressure and disappears when the vehicle has a high velocity to a certain degree.

FIG. 7B shows the setting example of the oblivion judging counter $C_n$ of the fixing point Q. In the setting example, a state satisfying the oblivion condition is generated exceeding $nC_v$ number, when an accumulated time in which the oblivion condition occurs is t1, the setting is made to oblivion the fixing point Q.

<Description of Method of Judging Other Oblivion>

The oblivion condition of the fixing point Q can set not only the velocity condition of the vehicle 1 but also other oblivion condition. Examples in the other oblivion condition are described below.

Figure 8A:
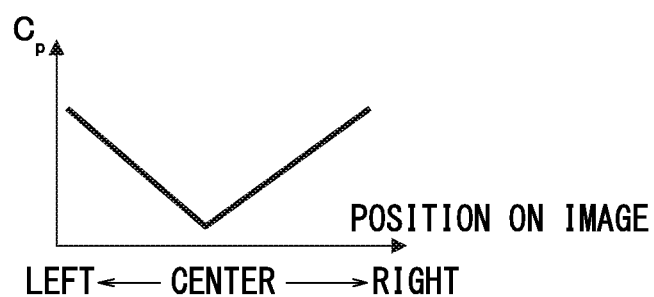
FIG. 8A is a graph showing a setting example of a center line monitoring number counter using to execute the oblivion judgement of the fixing point, the center being based on positions of endpoints in the image.
Figure 8B:
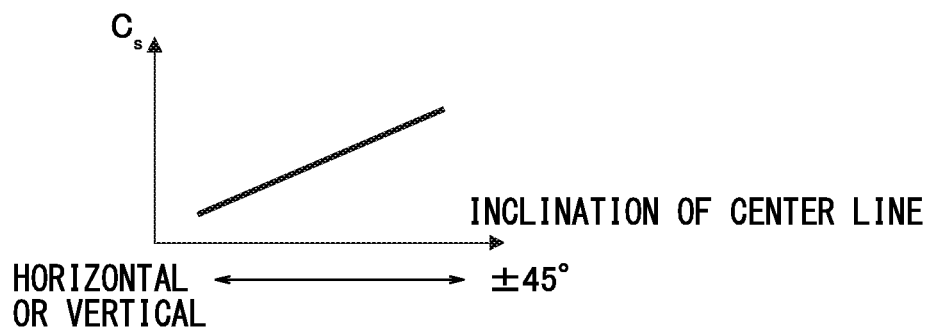
FIG. 8B is a graph showing a setting example of a center line monitoring number counter based on a direction of a center line.
Figure 8C:
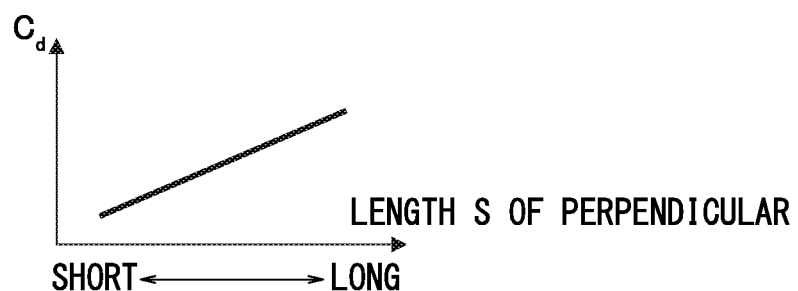
FIG. 8C is a graph showing a setting example of a center line monitoring number counter based on a distance between the fixing point and the endpoints.

FIGS. 8A to 8C show setting examples of the center line monitoring number counter set in executing a method of judging the other oblivion. FIG. 8A shows that the fixing point Q generated in a corner of the image is hard to oblivion, by oblivioning early the fixing point Q generated in a center portion of the image, in the image I.

A reason for executing the oblivion judgement is because the center line M is frequently appeared on a center portion of the image, other fixing point Q appears if dirt is clung even if the fixing point is easy to be oblivioned, and a new fixing point Q can be detected.

In executing the oblivion judgement, a center line monitoring number counter $C_p$ is set to be a smaller value as time when the fixing point Q is in the center portion of the image I, as shown in FIG. 8A, and the decrement of the center line monitoring number counter $C_p$ is executed by judging that the oblivion condition is satisfied when the endpoint of the center line is detected close to the fixing point Q in the image I. The following processing is as described above.

FIG. 8B shows that the fixing point Q is hard to oblivion when the center line extending in a direction of 45 degrees or −45 degrees in the image I is detected close to the fixing point Q, by oblivioning the fixing point Q early as time when the horizontal or perpendicular center line M is detected close to the fixing point Q in the image I.

A reason for executing the oblivion judgment is because the center line M is moved transversely in the image when the vehicle moves to turn, probability in which the oblique (direction of 45 degrees) center line M passages over the fixing point Q increases, and the circumstances are considered.

In executing the oblivion judgement, the decrement of a center line monitoring number counter $C_s$ is executed by setting the center line monitoring number counter $C_s$ to have a larger value as time when a direction of the center line M is close to 45 degrees or −45 degrees in the image I, as shown in FIG. 8B, and judging that the oblivion condition is satisfied when the center line M is detected close to the fixing point Q in the image I. The following processing is as described above. Meanwhile, the detection of the center line M close to the fixing point Q is judged by confirming that the length S of the perpendicular line down on the center line M from the fixing point Q is smaller than a predetermined value.

FIG. 8C shows that the fixing point Q is early oblivioned as time when the center line M is detected close to the fixing point Q in the image I and the fixing point Q is easy to oblivion when the center line M is detected on a distant place from the fixing point Q.

When the center line M is detected close to the fixing point Q, because there is high possibility that the dirt is already disappeared, it is possible to be easy to oblivion the fixing point Q by executing the oblivion judgment.

When executing the oblivion judgment, the decrement of a center line monitoring number counter $C_d$ is executed by setting the center line monitoring number counter $C_d$ to be a small value as time when the length of the perpendicular line down to the center line M from the fixing point Q is short, shown in FIG. 8C and judging that the oblivion condition is satisfied when the center line M is detected close to the fixing point Q in the image I. The following processing is as described above. Note that it is judged that the center line M is detected close to the fixing point Q by confirming that the length S of the perpendicular line down the center line M from the fixing point Q is smaller than a predetermined value.

In this way, the oblivion judgement is executed when the endpoints of the center line M are close to the fixing point Q, or the center line M is close to the fixing point Q. However, it is possible to change the method of the oblivion judgement in cases that the fixing point Q is in a position where the fixing point Q hides a distant place from the vehicle 1 in the image I and the fixing point Q is in a position where the fixing point Q hides a position immediately adjacent to the vehicle 1.

That is to say, when the fixing point Q is in the position hiding the distant place from the vehicle 1 in the image I, because the movement of the endpoints is small, there is a high possibility that the endpoints of the center line M remain hid the dirt. In such a case, it is desirable to execute the oblivion judgement by judging that the center line M is in a position close to the fixing point Q.

In addition, when the fixing point Q is in a position hiding the position immediately adjacent to the vehicle 1, because the movement of the endpoints is large and the position can be accurately detected, it is desirable to execute the oblivion judgement by judging that the endpoints of the center line M are close to the fixing point Q.

Moreover, it may change a setting value in executing the oblivion judgement according to where is the fixing point Q in the image I. For example, when the endpoints are detected on the position close to the vehicle 1, it is possible to be hard to oblivion the fixing points Q by setting either one of the radius $\Delta_d$ or the accumulated time $t_1$ to a large value. To implement the change in the setting value as described above, the setting value used in executing the oblivion judgement is prepared as a table and the setting value may be set referring to the table according to conditions of an image which is an object of the processing.

<Description of Method of Executing Concretely Method of Oblivion Judgment>

The plurality of oblivion judgement methods as described above are desirably executed in parallel. In that case, the oblivion judging counter $C_n$ may be configured to be incremented when either of the center line monitoring number counters $C_v$, $C_p$, $C_s$, and $C_d$ is zero (0).

A concrete method executing the oblivion judgement effectively is described hereinafter. The positions of the endpoints of the center line M detected from the image I and the position of the fixing point are stored and controlled in a list type.

FIG. 9 shows an example of the endpoint list 82 representing the positions of the endpoints detected from the image I. Information of the endpoints of both ends of the center line M every the center line M of the detected white line candidate area is described in the endpoint list 82.

In the endpoint list 82 are described, concretely, an effective flag (first column in FIG. 9) representing whether the endpoints can be effectively used in detecting the parking frame, times (second column in FIG. 9) at which the endpoints are monitored, actual endpoint positions (third column in FIG. 9) which are actual positions of the endpoints of the image, a movement distance (fifth column in FIG. 9) of the vehicle 1, predicted endpoint positions (fourth column in FIG. 9) predicted based on the movement distance of the vehicle 1, and count values (sixth to ninth columns in FIG. 9) of the center line monitoring number counters $C_v$, $C_p$, $C_s$, and $C_d$ set every the oblivion judgement method.

Here, the predicted endpoint positions are calculated based on a function f as previously decided from actual endpoint positions (for example, $(x_{11}, y_{11})$ detected in the past and a movement distance (for example, $K_1$). The thus calculated predicted endpoint positions (f $(x_{11}, K_1)$, f $(y_{11}, K_1)$) are stored in the fourth column shown in FIG. 9.

Then, information regarding the endpoints of the same center line M is stored in and controlled by one list in time series (from No.a column in FIG. 9).

FIG. 10 shows an example of the fixing point list 84 representing a list of a fixing point Q detected actually. An effective flag representing whether the fixing point Q is effective every the fixing point Q, a position of the fixing point Q, a positional relationship of the fixing point and the center line M around it, and information of each counter used in executing the oblivion judgement are stored in the fixing point list 84.

Information regarding the same fixing point Q is stored in and controlled by one list in time series.

The oblivion judgement is executed by use of the information stored in the endpoint list 82 and the fixing point list 84, prepared as described above. Then, when it is judged that the fixing point Q is to be oblivioned, after that the fixing point Q is not referred in the fixing point list 84 by becoming zero (0) the effective flag given to the fixing point Q.

<Description of Method of Detecting Parking Frame>

Next, a method of detecting the parking frame is described. Various methods of detecting the parking frame are considered, either method may be applied. Here, a method of detecting using shape characteristics of the parking frame is described.

The shape characteristics of the parking frame are, for example, as the following matters (1) to (3).

(1) The parking frame is an area between two lines formed by parallel white lines having a predetermined length and a predetermined interval.

(2) There is a case in which one of the two lines formed by the parallel white lines is used together in adjacent two parking frames, or the two white lines are drawn between the adjacent two parking frames.

(3) There is a case in which endpoints of the parallel white lines are connected each other by white lines, or a back side only of the parking frame is connected, as shown in FIG. 4A. In addition, there is a case that the endpoints of the parallel white lines are not connected each other.

In the present embodiment, a size of the parking frame monitored in the image I is first stored. Here, the size of the parking frame means a length (considered to a length of the center line M) of each of two lines formed by parallel white lines extending in a forward and rearward direction of the vehicle 1 when the vehicle 1 is parked in the parking frame and an interval between the two lines.

Because the image I is composed of the overhead images overlooked the vehicle 1 from right above, a range where the image I is monitored can easily be estimated by use of parameters converting the photographed images into the overhead images. Accordingly, it can be estimated how much size is a supposed parking frame monitored in the image I. Here, it is estimated that the length of the two lines formed by the parallel white lines extending in the forward and rearward direction of the vehicle 1 are monitored with the number $O_1$ of first predetermined pixels and the interval between the two lines is monitored with the number $O_2$ of second predetermined pixels.

Then, of white line candidate areas detected from the image I, a plurality pairs of white line candidate areas having approximately equal directions are first detected. A direction of the white line candidate areas may be considered to be a direction of the previously detected center line M (a direction of a line connecting the two endpoints)

When the interval among the thus detected parallel white line candidate areas is close to the number $O_2$ of the second predetermined pixels, it is judged that the pair of the parallel white line candidate areas constituting the parking frame is found out. Next, the length of the thus detected parallel white line candidate areas is obtained. This is calculated as the length of the center line M of the white line candidate areas. When the calculated length of the center line M is a value close to the length of the previously supposed parking frame, in other words, the number $O_1$ of the first predetermined pixels, it is judged that the white line candidate areas composes the parking frame. Actually, a predetermined width is set to the numbers $O_1$ and $O_2$ of predicted pixels, when a value in a range of the width is detected, it is judged that the condition is satisfied.

At this time, to detect securely the parking frame, the white line candidate areas involving the center line M detected close to the fixing points Q is handled by reducing a degree of contribution when being employed for detection of the parking frame. When reducing the degree of contribution, it may be conditioned that the white line candidate areas are detected close to the fixing points Q over a plurality of times in the past. When the parking frame including the white line candidate areas having a low degree of contribution is detected, the parking frame may be hard to detect the parking frame by setting to be smaller the predetermined width of the pixel number $O_1$, the pixel number $O_2$, or the pixel numbers $O_1$ and $O_2$, for example.

The white line candidate areas corresponding to the condition reducing the degree of contribution is judged by confirming that the effective flag of the foregoing endpoint list 82 is zero (0).

<Description of Operation in First Embodiment>

Figure 11:
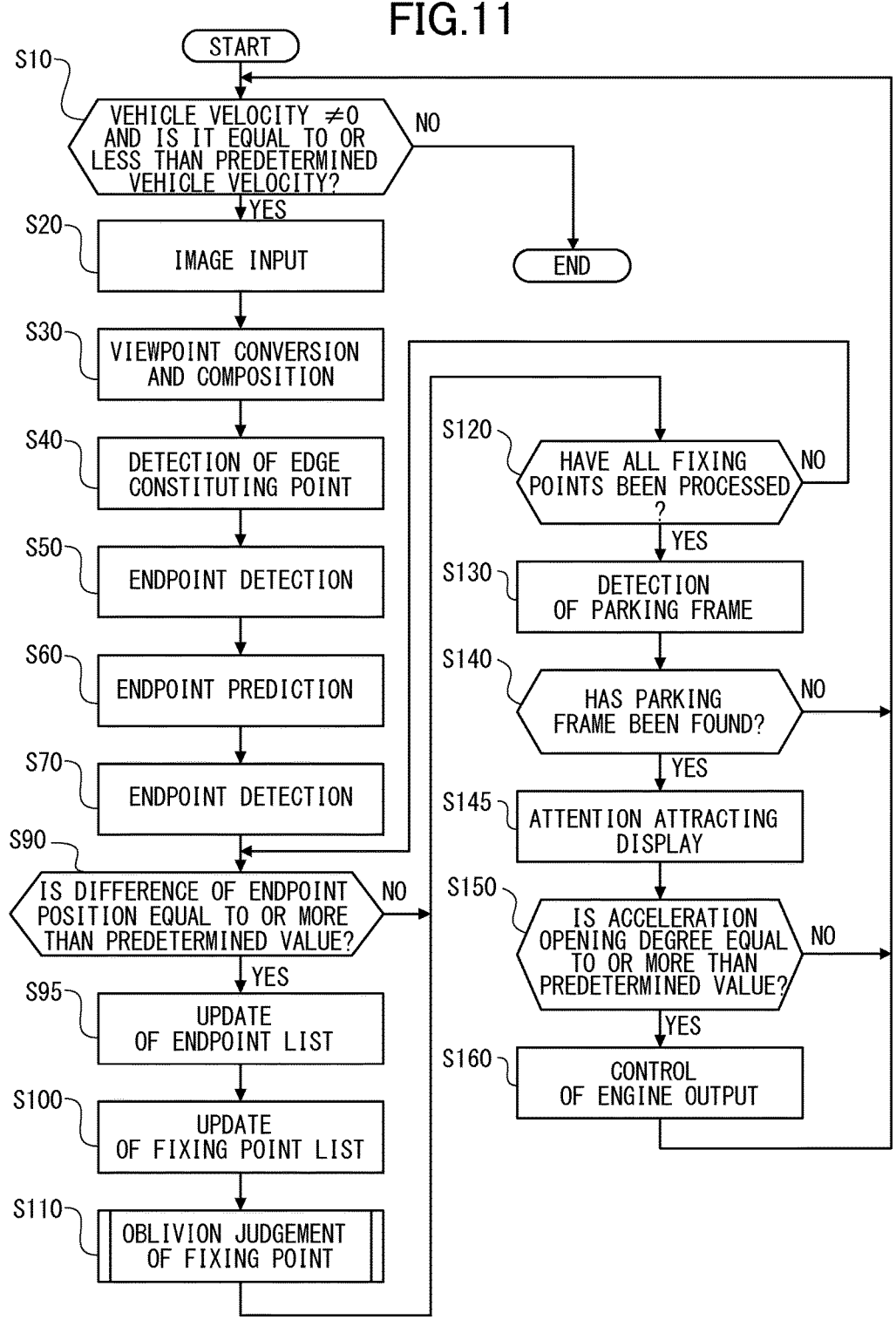
FIG. 11 is a flowchart explaining a flow of processing in Embodiment 1 according to the present invention.

Next, a series of operation flows carried out in the on-vehicle image processor 5 according to Embodiment 1 are described with reference to a flow chart shown in FIG. 11.

(Step S10)

A vehicle velocity of the vehicle 1 is detected based on an output of a vehicle sensor which is not shown in FIG. 2. Then, the detected vehicle velocity is not 0, and whether it is equal to or less than a predetermined vehicle velocity is judged. If it is judged that the detected vehicle velocity is not 0 and is equal to or less than a predetermined vehicle velocity, the flow proceeds to step S20 and otherwise the processing of FIG. 11 is completed.

(Step S20)

Circumference of the vehicle 1 is imaged by the imager 10.

(Step S30)

In the image convertor and compositor 20, the images imaged by the imager 10 are converted into the overhead images and further synthesized in the single image as shown in FIG. 4A.

(Step S40)

In the edge pair detector 32, edge constituting points which constitute the positive edges and the negative edges are detected from the image I.

(Step S50)

In the center line detector 34, the center line M constituted by the middle points of the positive edge and the negative edge, and the positive edge and the negative edge is detected and further positions of endpoints as the endpoints of the center line M are detected in the endpoint position detector 40. At this time, under a condition where the positions of the endpoints exist in a predetermined range, the position of the endpoints may be detected. For example, under a detection condition where the positions of the endpoints are away more than a predetermined distance from a boundary of imaging areas of the image I as imaged, it is possible to exclude the endpoints close to the boundary of the imaging areas of the image I.

(Step S60)

Based on the behavior of the vehicle 1 measured by the vehicle behavior measurer 50, positions of predicted endpoint are acquired in the image I by the endpoint movement position predictor 60. A predetermined value is used for the time difference $\Delta_t$ at this time. However, as described above, when it is detected that the velocity of the vehicle 1 is higher than a predetermined value, the calculation of the predicted endpoint positions is executed without waiting the passage of the time difference $\Delta_t$. Even if the vehicle velocity is low, when the positions of the endpoints move largely, at that time, the calculation of the predicted endpoint position is executed as described above.

(Step S70)

In the endpoint position detector 40, the actual endpoint positions at the time predicted in step S60 are detected (Step S90)

In the endpoint movement amount judger 70, a difference in position between the predicted endpoint positions and the actual endpoint positions is calculated. Then, when the calculated positional difference is larger or more than a predetermined value, the flow proceeds to step S95, and otherwise proceeds to S120.

(Step S95)

The endpoint list 82 is updated based on the positions of the endpoints detected in steps S50 and S70.

(Step S100)

The positions before the endpoints evaluated in step S90 move are newly registered in the fixing point list 84 to update the fixing point list 84.

(Step S110)

In the endpoint position oblivion judger 90, the oblivion judgement of the fixing point Q is executed. A content of the processing is described below.

(Step S120)

Whether the oblivion judgement with respect to all the fixing points Q is executed is judged. When the condition is satisfied, the flow proceeds to step S130 and otherwise returns to step S90.

(Step S130)

In the parking frame detector 100, the parking frame is detected from the image I. The detailed content of the processing is described as described above and is, therefore, omitted.

(Step S140)

As a result of the execution of step S130, whether the parking frame is found is judged. If the parking frame is found, flow proceeds to step S145 and if the parking frame is not found, the flow returns to step S10.

(Step S145)

Information taking care that the acceleration operation and the break operation do not make mistakes in the parking lot is output by the information output device 85 through screen display or voice guide to bring attention to a driver.

(Step S150)

In the acceleration opening degree detector 110, whether the acceleration opening degree is a predetermined value or more is judged. If the acceleration opening degree is the predetermined value or more, the flow proceeds to step S160, if the acceleration opening degree does not reach the predetermined value, the flow returns to step S10.

(Step S160)

A control reducing the engine output is executed in the vehicle behavior controller 120 and an engine output corresponding to an acceleration opening degree which is actually stepped is adapted not to be output. Thereafter, the flow returns to step S10.

Figure 12:
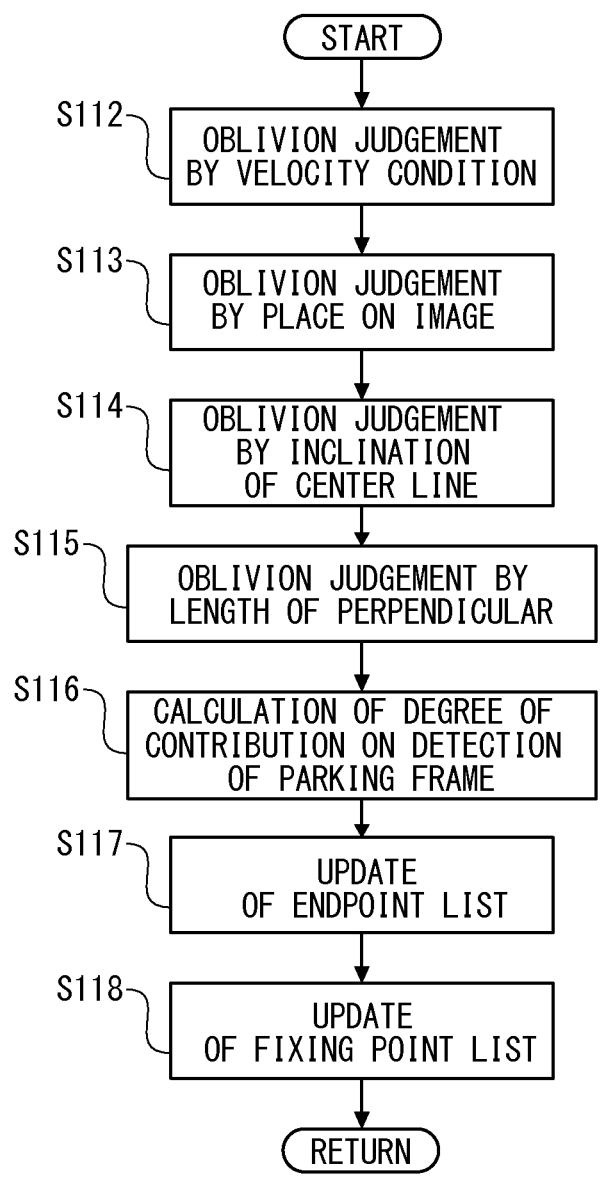
FIG. 12 is a flowchart explaining a flow of processing of the oblivion judgement of the fixing point executed in the flowchart of FIG. 11.

Next, a content of processing the oblivion judgement of the fixing point is described with reference to FIG. 12.

(Step S112)

In the oblivion judger 92 based on the vehicle velocity condition, when it is judged in the distance calculator 75 that the pixel $m_1$ or pixel $m_n$ which is the endpoint detected by the endpoint position detector 40 is close to the fixing point Q, the center line monitoring number counter $C_v$ and the oblivion judging counter $C_n$ are counted by setting the center line monitoring number counter $C_v$ based on the velocity of the vehicle 1. Then, if the oblivion judging counter $C_n$ reaches the predetermined value, the fixing point Q is oblivioned.

(Step S113)

In the oblivion judger 94 based on the positions of the endpoints, when the it is judged in the distance calculator 75 that the pixel $m_1$ or pixel $m_n$ which is the endpoint detected by the endpoint position detector 40 is close to the fixing point Q, the center line monitoring number counter $C_p$ and the oblivion judging counter $C_n$ are counted by setting the center line monitoring number counter $C_p$ based on the position of the fixing point Q. Then, if the oblivion judging counter $C_n$ reaches the predetermined value, the fixing point Q is oblivioned.

(Step S114)

In the oblivion judger 96 based on the direction of the center line, when it is judged in the distance calculator 75 that the pixel $m_1$ or pixel $m_n$ which is the endpoint detected by the endpoint position detector 40, or the center line M is close to the fixing point Q, the center line monitoring number counter $C_s$ and the oblivion judging counter $C_n$ are counted by setting the center line monitoring number counter $C_s$ based on the direction of the center line M. Then, if the oblivion judging counter $C_n$ reaches the predetermined value, the fixing point Q is oblivioned.

(Step S115)

In the oblivion judger 98 based on the length of the perpendicular line, when it is judged in the distance calculator 75 that the pixel $m_1$ or pixel $m_n$ which is the endpoint detected by the endpoint position detector 40, or the center line M is close to the fixing point Q, the center line monitoring number counter $C_d$ and the oblivion judging counter $C_n$ are counted by setting the center line monitoring number counter $C_d$ based on the distance of the center line and the fixing point Q. Then, if the oblivion judging counter $C_n$ reaches the predetermined value, the fixing point Q is oblivioned.

(Step S116)

When it is judged in the distance calculator 75 that the pixel $m_1$ or pixel $m_n$ which is the endpoint detected by the endpoint position detector 40, or the center line M is close to the fixing point Q, the degree of contribution of the white line candidate area having the pixel $m_1$ or pixel $m_n$ which is the endpoint, or the center line M is reduced in executing the detection of the parking frame by the parking frame detector 100.

At this time, the distance calculator 75 detects that the pixel $m_1$ or pixel $m_n$ which is the endpoint detected by the endpoint position detector 40 is in a predetermined range for a predetermined time to the fixing point Q, when the fixing point Q is in a position where the fixing point Q hides the position immediately adjacent to the vehicle 1 in the image I and that the pixel $m_1$ or pixel $m_n$ which is the endpoint detected by the endpoint position detector 40, or the center line M is into the fixing point Q, when the fixing point Q is in the position hiding the distant place away from vehicle 1 in the image I. In this way, the degree of contribution of the white line candidate area may be reduced. In addition, a value of each of the predetermined time and the predetermined range may be switched by a distance, or the value may be continuously changed in accordance with the predetermined distance. Then, the reduction of the degree of contribution is stored by setting the effective flag (first column in FIG. 9) of the endpoint list 82 to be 0.

(Step S117)

The content of the endpoint list 82, more specifically, the effectivity of the endpoints, the values of the center line monitoring number counters $C_v$, $C_p$, $C_s$, and $C_d$, the detected and predicted endpoint positions, and the movement amount of the vehicle 1 are updated at any time.

(Step S118)

The content of the endpoint list 84, more specifically, the effectivity of the fixing point Q, the distance to the closest center line M, the position of the fixing point Q, the values of the center line monitoring number counters $C_v$, $C_p$, $C_s$, and $C_d$, and the value of the oblivion judging counter $C_n$ are updated at any time. Thereafter, the flow proceeds to step S120 (see FIG. 11).

As described above, in the on-vehicle image processor 5 according to the embodiment of the present invention configured in this way, the imager 10 set on the vehicle 1 images the image I including the at least road surface of the circumference of the vehicle 1, the white line candidate area detector 30 detects the white line candidate areas capable of constituting the parking frame from the image I as imaged, and the endpoint position detector 40 detects from each of the thus detected white line candidate areas the positive edges composed of first pixels where the brightness value of pixels arranged close in a predetermined direction changes largely and brightly more than a predetermined value, the negative edges composed of second pixels where the brightness value of pixels arranged close in a predetermined direction changes largely and darkly more than a predetermined value and arranged with an interval w from the positive edges and the center line M formed by connecting the middle point between the positive pixel and the negative pixel and the middle point between the positive pixel and the negative pixel, respectively and detects the positions of the two endpoints of the center line M as the endpoints of the white line candidate area.

Then, endpoint movement position predictor 60 predicts a position in the image where the two endpoint positions detected by the endpoint position detector 40 are estimated to be moved in the image I within the predetermined time difference $\Delta_t$, and the endpoint movement amount judger 70 acquires a difference between the position of the endpoint predicted in the endpoint movement position predictor 60 and the position of the endpoint detected actually in the endpoint position detector 40 in the time at which the predetermined time difference $\Delta_t$ passages.

At the time when the difference of the endpoints is largest than the predetermined value, the position before the endpoint are moved is stored in the endpoint position storage 80. When the distance calculator 75 judges that the white line candidate area or the endpoints are within a predetermined distance from the positions of the endpoints stored in the endpoint position storage 80, the parking frame detector 100 detects the parking frame by reducing the degree of contribution of the white line candidate area. Therefore, even if the dirt is clung to the imager 10 and a break is generated in the white line candidate area, it is possible to stably and securely detect the position of the parking frame drawn on the road surface.

In addition, in the on-vehicle image processor 5 according to the embodiment of the present invention, the time difference $\Delta_t$ that predicts that the pixel $m_1$ or pixel $m_n$ which is the endpoints of the center line M of the white line candidate area is set more shortly in the endpoint movement position predictor 60 as time when the velocity of the vehicle 1 measured in the vehicle behavior measurer 50. As a result, even if the vehicle velocity is high, it is possible to accurately detect the positions of the endpoints of the white line candidate area and further securely execute the determination whether the fixing point Q is generated.

Also, in the on-vehicle image processor 5 according to the embodiment of the present invention, when the vehicle 1 moves by a predetermined distance before the predetermined time difference $\Delta_t$ passages, the positions of the endpoints at the time when the vehicle 1 moves by the predetermined distance are predicted in the endpoint movement position predictor 60. Therefore, even if the vehicle 1 changes largely a direction at a short time, it is possible to accurately detect the positions of the endpoints of the white line candidate area and further securely execute the determination whether the fixing point Q is generated.

Moreover, in the on-vehicle image processor 5 according to the embodiment of the present invention, when it is judged that a distance between the positions of the endpoints (fixing points Q) stored in the endpoint position storage 80 and the position of the pixel $m_1$ or pixel $m_n$ which is of the endpoints detected by the endpoint position detector 40 or the center line M is within a predetermined value, the endpoint position oblivion judger 90 judges whether the state continues throughout a predetermined time. If the state continues throughout the predetermined time, the fixing point Q increases as a time elapses because the fixing point Q stored in the endpoint position storage 80 is clear, it, therefore, is possible to prevent the parking frame from being not detected.

Moreover, in the on-vehicle image processor 5 according to the embodiment of the present invention, because the endpoint position oblivion judger 90 is clear the position of the fixing point Q at the short time as time when the velocity of the vehicle 1 is within the predetermined vehicle velocity range and the vehicle velocity is high, the fixing point Q can easily be oblivioned when confirming that the white line candidate area passages the neighborhood of the fixing point Q when the vehicle velocity is high.

In addition, in the on-vehicle image processor 5 according to the embodiment of the present invention, because the endpoint position oblivion judger 90 is clear the position of the fixing point Q at the short time as time when the fixing point Q is close to the center portion of the image I, the fixing point Q can easily be oblivioned at the neighborhood of the center portion of the image I.

Furthermore in the on-vehicle image processor 5 according to the embodiment of the present invention, because the endpoint position oblivion judger 90 is clear the position of the fixing point Q at the short time as time when a distance between the fixing point Q and the endpoints detected by the endpoint position detector 40 is close, the fixing point Q can easily be oblivioned when possibility that the dirt disappears already increases.

In addition, in the on-vehicle image processor 5 according to the embodiment of the present invention, because the endpoint position oblivion judger 90 is clear the position of the fixing point Q at the short time as time when the direction where the white line candidate area extends is close to the horizontal direction of the image I, the fixing point can easily be oblivioned when probability in which the center line M passages over the fixing point Q increases.

Furthermore, in the on-vehicle image processor 5 according to the embodiment of the present invention, when a distance between the endpoint (fixing point Q) calculated by the distance calculator 75 and stored in the endpoint position storage 80 and the endpoint detected by the endpoint position detector 40 is smaller than a predetermined value, it is possible to detect the parking frame stably without being influenced by uncertain white line candidate areas. This is because tolerance of the length of the frame detecting the parking frame is narrow in detecting the parking frame including the white line candidate area having the endpoints detected by the endpoint position detector 40 when executing the detection of the parking frame in the parking frame detector 100.

Note that, in Embodiment 1, the detection of the parking frame is executed by detecting the center line M of the white line candidate area. However, the detection of the parking frame is not limited to this method. Even if the similar processing to that as described above is executed by use of line elements composed of the positive edges and line elements composed of the negative edges which are found in detecting the white line candidate areas, the similar effects can be acquired.

In that case, the endpoints of the line elements composed of the positive edges and the line elements composed of the negative edges are configured to be detected in the endpoint position detector 40. Then, the detection of the parking frame is executed by searching pairs of the line elements composed of the positive edges and the line elements composed of the negative edges, the line elements being arranged with the predetermined interval.

In addition, in Embodiment 1, when each of the endpoints of the white candidate area or the center line M is close to the fixing point Q, the degree of contribution of the white line candidate area is reduced in detecting the parking frame. However, even if the white line candidate area is not employed in detecting the parking frame, the similar effect can be acquired.

Embodiment 2

Next, a second embodiment according to the present invention is described. In Embodiment 2, in an inner portion of an area closer than a predetermined distance from the vehicle 1 in the image imaged by the imager 10, the coordinate conversion of the imaged image is executed to form the overhead image overlooked the vehicle 1 from right above and the overhead image is processed to detect the parking frame, and in an inner portion of an area away more than a predetermined distance from the vehicle 1, the image imaged by the imager 10 is not converted into the overhead image and the image processing of the imaged image is directly executed to detect the parking frame.

In addition, when the vehicle 1 employs a wiper, the time difference $\Delta_t$ used in calculating the predicted endpoint position is set to a time difference shorter than that in a case where the wiper is not employed.

A configuration of Embodiment 2 is first described with reference to FIGS. 1 and 13. An on-vehicle image processor 6 shown in Embodiment 2 is mounted on the vehicle 1 and includes the front camera 10A, the left camera 10B, the right camera 10C and the rear camera 10D, which are provided to pick up images in different four directions from the vehicle, as shown in FIG. 1.

Figure 13:
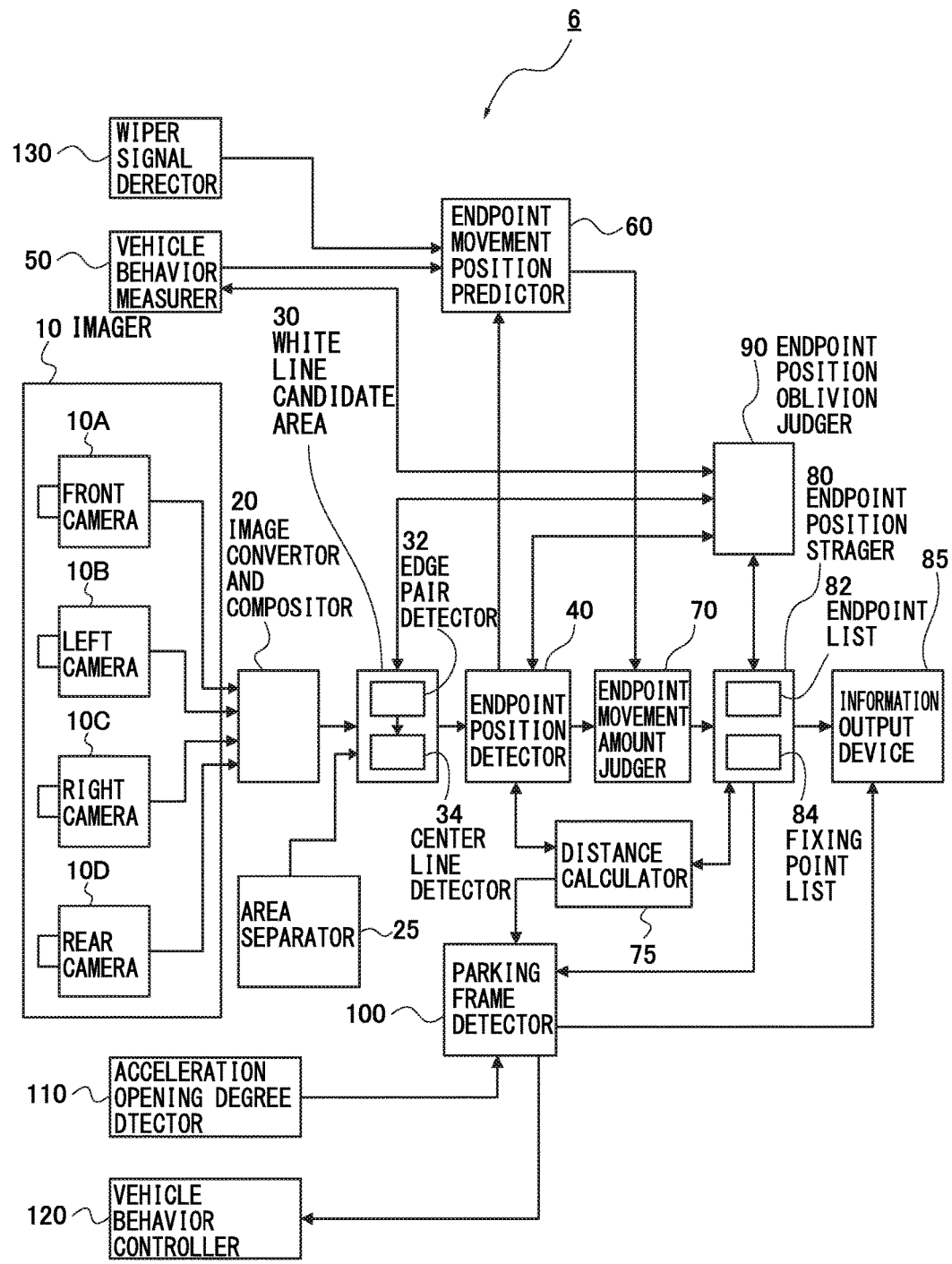
FIG. 13 is a block diagram showing an entire configuration of Embodiment 2 according to the present invention.

FIG. 13 is a block diagram illustrating an entire configuration of the on-vehicle image processor 6. The on-vehicle image processor 6 includes an area separator 25 that separates the image imaged by the imager 10 in a proximity area and a distant area based on a distance from the imager 10 to the road surface, in addition to the configuration of Embodiment 1 and a wiper signal detector 130 that detects a wiper signal representing that the vehicle 1 employs the wiper.

An operation of Embodiment 2 is described hereinafter with respect to main points differ from Embodiment 1. Overlapped parts with the operation of Embodiment 1 are not described.

<Description of Case Using Processing Target Image Separately>

A case of using the image that detects the parking frame separately is described with reference to FIG. 14. In Embodiment 2, the detection of the parking frame is executed by processing the overhead image overlooked the vehicle from right above by the coordinate conversion, similarly to Embodiment 1, in a case of a near distance region $R_n$ where a distance from the imager 10 to the road surface is below a predetermined distance $d_{th}$, of the image I imaged by the imager 10, and the detection of the parking frame is executed by processing the imaged image where the coordinate conversion is not executed, in a case of a far distance region $R_f$ where the distance from the imager 10 to the road surface is the predetermined distance $d_{th}$ or more, as shown in FIG. 14.

Figure 14:
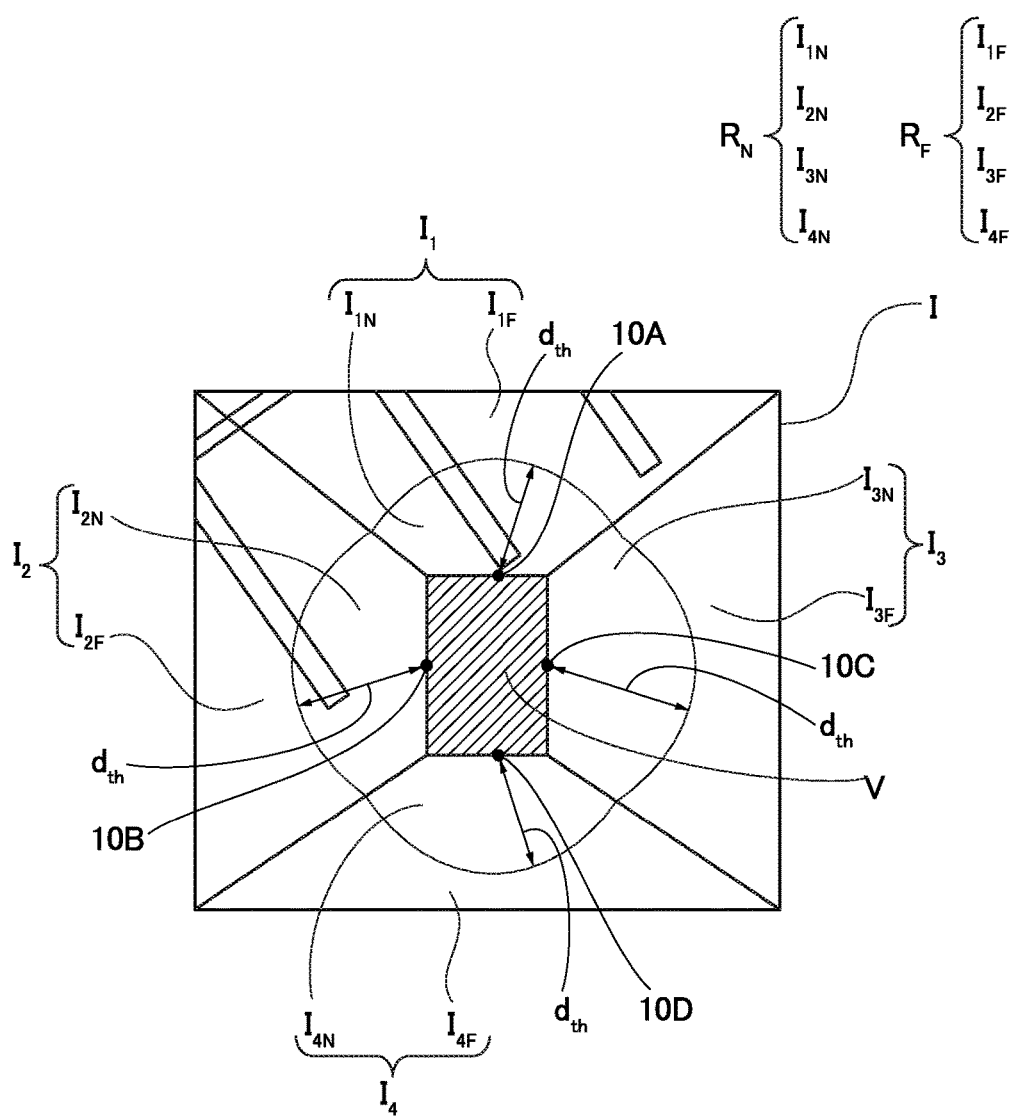
FIG. 14 is an explanatory view explaining a range of an image which is a target of processing in Embodiment 2 according to the present invention.

The near distance region $R_n$ is composed of a near distance area $I_{1n}$ where a distance from the front camera 10A to the road surface is below the predetermined distance $d_{th}$ in the image $I_1$ imaged by the front camera 10A constituting the imager 10, a near distance area $I_{2n}$ where a distance from the left camera 10B to the road surface is below the predetermined distance $d_{th}$ in the image $I_2$ imaged by the left camera 10B, a near distance area $I_{3n}$ where a distance from the right camera 10C to the road surface is below the predetermined distance $d_{th}$ in the image $I_3$ imaged by the right camera 10C, and a near distance area $I_{4n}$ where a distance from the rear camera 10D to the road surface is below the predetermined distance $d_{th}$ in the image $I_4$ imaged by the rear camera 10D, as shown in FIG. 14.

The position of the boundary between the near distance region $R_n$ and the far distance area $R_f$ in the image I can be previously obtained with calculation by use of the information regarding the imaging range of the image I and the value of the predetermined distance $d_{th}$. Therefore, the images imaged by the four cameras are adapted to execute the coordinate conversion into the overhead images by the image convertor and compositor 20, similarly to Embodiment 1, and the composition of the overhead images to generate the single image. Thereafter, with respect to the inner portion of the near distance region $R_n$, the processing of each of the detection of the white line candidate area, the detection of the positions of the endpoints, the calculation of the predicted endpoint positions, the judgement of the endpoint movement amount and the storage of the positions of the endpoints, which are described in Embodiment 1 is sequentially executed. Then, the fixing point Q is detected. The white line candidate area having the endpoints close to the fixing point Q is not employed to detect the parking frame and the oblivion judgement of the fixing point Q is executed. The flow and the content of the processing of the aforementioned part are as described in Embodiment 1.

On the other hand, with respect to the far distance region $R_f$ where the distance from the imager 10 is the predetermined distance $d_{th}$ or more, the images imaged by the imager 10 are not converted into the overhead images and directly processed to detect the parking frame.

The image processing may execute with the same procedure as in the overhead images. However, because the parking frame is displayed in a small size as the distance from the vehicle is long, when the detection of the white line candidate area is executed, a threshold value of the interval w between the positive edge and the negative edge is set to be small as going to a distant place, that is to say, reaching the upper portion of the image.

Note that, because it is not necessary search the white line candidate area with respect to the other of the road surface, it is desirable to previously extract areas in which the road surface is estimated to be displayed from the imaged images Furthermore, in the images imaged by the imager 10, because the movement amount of the endpoints at the time when the vehicle 1 moves is very small compared with the converted overhead images, a timing that calculates the predicted endpoint positions is set to be a time longer than the time difference $\Delta_t$ set in processing the overhead images. Thereby, because the positions of the endpoints of the white candidate area can be accurately detected, it is possible to further securely execute the judgement whether the fixing point Q is generated.

After the fixing point Q is detected, when the endpoints of the white line candidate area is detected close to the fixing point Q similarly to the processing of the overhead images, the white line candidate area is employed by reducing the degree of contribution when detecting the parking frame.

Further, the oblivion judgement of the fixing point Q is executed similarly to Embodiment 1.

<Description of Setting Method of Prediction Time Difference based on Wiper Operation>

When the vehicle 1 employs the wiper, it is considered that it is raining. Then, when it is raining, there is high possibility that water drop is clung to each lens of the cameras constituting the imager. If the water drop is clung to the surface of the lens, similarly to sludge, turbulence is generated in the image of the parking frame or the parking frame disappears in an area where the water drop is clung. Therefore, by the image processing, the position of the parking frame cannot be recognized.

However, because the water drop is a high fluidity differently from the sludge, there is high possibility that it drops along the lens at a short time or blown off by wind pressure generated by the running of the vehicle 1. In other words, even if the parking frame cannot temporarily recognize by the water drop, there is possibility of returning to a state capable of recognizing in a short time.

Therefore, when the vehicle 1 drives the wiper, the calculation of the predicted endpoint positions is adapted to execute at a time difference shorter than a case where the wiper is not driven.

Thereby, because the oblivion judgement of the fixing point Q can be executed at a short time, when the fact that the water drop clings is lost, it is possible to rapidly use the white line candidate area monitored at a position of the water drop for the detection of the parking frame.

<Description of Operation of Embodiment 2>

Next, a flow of a series of operations of the on-vehicle image processor 6 according to Embodiment 2 is described with reference to a flow chart shown in FIG. 15.

(Step S200)

A velocity of the vehicle 1 is detected based on an output of a vehicle speed sensor which is not shown in FIG. 13. Then, the vehicle velocity as detected is not 0 and whether it is a predetermined vehicle velocity or less which is previously set is judged. When it is judged that the detected vehicle velocity is not 0 and whether it is a predetermined vehicle velocity or less, the flow proceeds to step S210 and otherwise the processing of FIG. 15 is completed.

(Step S210)

Circumference of the vehicle 1 is imaged by the imager 10.

(Step S220)

In the image convertor and compositor 20 (image conversion part), the images imaged by the imager 10 are converted into the overhead images, and further synthesized in a single image I, as shown in FIG. 4A. Then, in the area separator 25, images formed by only the near distance region $R_n$ ($I_{1n}$, $I_{2n}$, $I_{3n}$ and $I_{4n}$) (see FIG. 14) are generated from the thus generated image I.

(Step S230)

In the area separator 25, images formed by only the far distance region $R_F$ ($I_{1F}$, $I_{2F}$, $I_{3F}$ and $I_{4F}$) (see FIG. 14) are generated from the images imaged by the imager 10. Note that the images of the near distance region $R_n$ ($I_{1n}$, $I_{2n}$, $I_{3n}$ and $I_{4n}$) are images which are not converted into the overhead images and exclude regions corresponding to the near distance region $R_n$ ($I_{1n}$, $I_{2n}$, $I_{3n}$ and $I_{4n}$).

(Step S240)

In the white line candidate area detector 30 and the endpoint position detector 40, the white line candidate area considered to constitute the parking frame is detected from the images of the near distance region $R_n$ ($I_{1n}$, $I_{2n}$, $I_{3n}$ and $I_{4n}$) and the images of the far distance region $R_F$ ($I_{1F}$, $I_{2F}$, $I_{3F}$ and $I_{4F}$), further the center line is detected from the detected white line candidate area, and the positions of the endpoints at the opposite ends of the center line are detected. The series of processing flows are as described in Embodiment 1. Meanwhile, with respect to the images of the far distance region $R_F$ ($I_{1F}$, $I_{2F}$, $I_{3F}$ and $I_{4F}$), the detection of the white line candidate area is executed by setting the threshold value of the positive edges and the negative edges to be small as going to a far place.

(Step S250)

In the wiper signal detector 130, whether the wiper of the vehicle 1 is operated is judged. When the wiper is operated, the flow proceeds to step S260, and when the wiper is not operated, the flow proceeds to step S270.

(Step S260)

A time difference that calculates the predicted endpoint positions is set to $\Delta_t = \Delta_{t1}$.

(Step S270)

A time difference that calculates the predicted endpoint positions is set to $\Delta_t = \Delta_{t2}$. Here, $\Delta_{t2}$ is a time shorter than $\Delta_{t1}$.

(Step S280)

In the endpoint movement position predictor 60, the predicted endpoint positions of the images of the near distance region $R_n$ ($I_{1n}$, $I_{2n}$, $I_{3n}$ and $I_{4n}$) are calculated with the time difference $\Delta_t$ and the predicted endpoint positions of the images of the far distance region $R_F$ ($I_{1F}$, $I_{2F}$, $I_{3F}$ and $I_{4F}$) are calculated with the time difference $\Delta_t + \Delta_{t3}$.

(Step S290)

In the endpoint position detector 40, the actual endpoint positions at the time predicted in step S280 are detected.

(Step S300)

In the endpoint movement amount judger 70, a difference between the predicted endpoint positions and the actual endpoint positions in position is calculated. Then, when the calculated difference in position is the predetermined value or more, the flow proceeds to step S310 and otherwise proceeds to step S330.

(Step S310)

The positions of the endpoints evaluated in step S300 before they are moved are newly registered in the fixing point list 84, and the fixing point list 84 is updated. In addition, the endpoint list 82 is updated based on the positions of the endpoints detected in step S290.

(Step S320)

In the endpoint position oblivion judger 90, the oblivion judgement of the fixing point Q is executed. The processing is as described in FIG. 12.

(Step S330)

Whether the oblivion judgement is executed with respect to all the fixing points Q is judged. If the condition satisfies, the flow proceeds to step S340, otherwise returns to step S300.

(Step S340)

The endpoint list detected from the images of the near distance region $R_n$ ($I_{1n}$, $I_{2n}$, $I_{3n}$ and $I_{4n}$) and the endpoint list detected from the images of the far distance region $R_F$ ($I_{1F}$, $I_{2F}$, $I_{3F}$ and $I_{4F}$) are merged, information representing the same center line is combined into one. Meanwhile, because the boundary position between the near distance region $R_n$ ($I_{1n}$, $I_{2n}$, $I_{3n}$ and $I_{4n}$) and the far distance region $R_F$ ($I_{1F}$, $I_{2F}$, $I_{3F}$ and $I_{4F}$) is previously known, the close endpoints at the boundary position are judged to represent the same center line.

(Step S350)

In the parking frame detector 100, the parking frame id detected from the image I. The detailed processing content is omitted because it is described above.

(Step S360)

As a result of the execution of step S350, whether the parking frame is found is judged. When the parking frame is found, the flow proceeds to step S370, when the parking frame is not found, the flow returns to step S200.

(Step S370)

By the information output device 85, the information taking care not to mistake the acceleration operation and the braking operation in the parking lot is output through a screen display or voice guide to bring the attention to the driver.

(Step S380)

In the acceleration opening degree detector 110, whether the acceleration opening degree is the predetermined value or more is judged. When the acceleration opening degree is the predetermined value or more, the flow proceeds to step S390, and when the acceleration opening degree is below the predetermined value, the flow returns to step S200.

(Step S390)

In the vehicle behavior controller 120, the control restricting the engine output is executed so that an engine output corresponding to an acceleration opening degree pressed actually is not output. Thereafter, the flow returns to step S200.

Meanwhile, although Embodiment 2 is configured to change to be short the time difference $\Delta_t$ by detecting that the vehicle 1 employs the wiper, this configuration is not limited to this embodiment. In other words, when the fact that an adhesive dirt clings is predicted by use of an adhesive judger which predicts that the adhesive dirt clings, it is possible to securely recognize the clung dirt by setting the time difference $\Delta_t$ to be long.

Not only the wiper signal detector 130, but also various methods are considered for a configuration of the adhesive judger, any one thereof may be employed.

That is to say, to predict that the water drop which is typically raindrop clings, a raindrop sensor that detects raindrop clung to a front window may be used, or friction on the road surface may be measured by a miu (μ) sensor so that it is detected that the miu is low. In addition, reflection on the road surface is detected by a camera or optical sensor that monitors the road surface and it may be detected that the reflection on the road surface is high.

On the other hand, to predict that the adhesive dirt which is typically sludge dirt clings, the road surface is monitored by a camera and a case of off road may be detected. In addition, the clung state of dirt can be judged by use of an output of a vehicle running control device such as ABS (Anti-Lock Braking System), VOC (Vehicle Dynamics Control), TCS (Traction Control System), and so on.

A described above, in the on-vehicle image processor 6 according to the embodiment of the present invention as thus configured, because an area where the a distance the imager 10 is a predetermined distance or more, in the image has a predetermined time difference $\Delta_t$ longer than an area where the a distance the imager 10 is below a predetermined distance, it is possible to accurately detect the positions of the endpoints of the white line candidate area and further secularly execute the determination as to whether the fixing point Q is generated.

Moreover, in the on-vehicle image processor 6 according to the embodiment of the present invention as thus configured, the wiper signal detector 130 determining possibility that an adhesive is clung to the imager 10 is provided. When it is judged that the vehicle 1 employs the wiper, in other words, when it is judged that there is a high possibility of the clung adhesive, the predetermined time difference $\Delta_t$ is set to be further short and the oblivion judgement of the fixing points Q can be executed at a short time. Therefore, when the clung water drop is lost, the white line candidate area monitored at a position of the water drop can rapidly be employed for the detection of the parking frame.

Furthermore, in the on-vehicle image processor 6 according to the embodiment of the present invention as thus configured, the image convertor and compositor 20 that converts the images imaged by the imager into the overhead images overlooked the vehicle 1 from just above is provided. In the near distance region Rn where a distance from the imager 10 is within the predetermined distance, the detection of the parking frame is executed by use of the overhead images converted by the image convertor and compositor 20, and in the far distance region RF where the distance from the imager 10 is the predetermined distance or more, the detection of the parking frame is executed without converting the images imaged by the imager 10 into the overhead images in the image convertor and compositor 20. As a result, regardless of the distance from the imager 10, the positions of the endpoints of the white line candidate area can accurately be detected. Therefore, the determination whether the fixing point Q is generated can further securely be executed.

Although the embodiments according to the present invention have been described in detail, the embodiments are mere examples. Therefore, modifications or the like can be made to the embodiments as long as such modifications are within the scope of the present invention as defined by the Claims.

CROSS-REFERENCE TO RELATED APPLICATION

This application is based upon and claims the benefit of priority to Japanese Patent Application No. 2012-258696 filed on Nov. 27, 2012, the entire disclosures of which are incorporated herein by reference.

LIST OF REFERENCE SIGNS

5 on-vehicle image processor
10 imager
10A front camera
10B left camera
10C right camera
10D rear camera
20 image convertor and compositor
30 white line candidate area detector
32 edge pair detector
34 center line detector
40 endpoint position detector
50 vehicle behavior measurer
60 endpoint movement position predictor
70 endpoint movement amount judger
75 distance calculator
80 endpoint position storage
82 endpoint list
84 fixing point list
85 information output device
90 endpoint position oblivion judger
100 parking frame detector
110 accelerator opening degree detector
120 vehicle behavior controller

The invention claimed is:

1. An on-vehicle image processor comprising:
an imager mounted on a vehicle, which monitors circumference of the vehicle and captures images containing at least a road surface;
a white line candidate area detector that detects a white line candidate area which is estimated to form a parking frame from the image imaged by the imager;
an endpoint position detector that detects, from the detected white line candidate area, positions of two endpoints of a center line connecting middle points of lines connecting between each of positive edges in which a brightness of pixels close to a predetermined direction changes to be larger and brighter than a predetermined value and each of negative edges in which a brightness of pixels close to the predetermined direction changes to be larger and darker than a predetermined value, the negative edge being positioned in a predetermined distance from the positive edge;
a vehicle behavior measurer that measures a behavior of the vehicle;
an endpoint movement position predictor that predicts positions in the image to which the two endpoints detected by the endpoint position detector are estimated to be moved during a predetermined time difference, based on a behavior of the vehicle measured by the vehicle behavior measurer;
an endpoint movement amount judger that obtains a difference between the positions of the endpoints predicted by the endpoint movement position predictor and the positions of the endpoints detected by the endpoint position detector and judges whether the difference is larger than a predetermined value;

an endpoint position storage that stores the positions of endpoints when in the endpoint movement amount judger judges that the difference of the positions of the endpoints is larger than the predetermined value;
a parking frame detector that detects a parking frame based on a position of the white line candidate area; and
a distance calculator that calculates a distance between the positions of the endpoints detected by the endpoint position detector or line elements having the endpoints and the positions of the endpoints stored in the endpoint position storage,
wherein, when the distance detected by the distance calculator is smaller than a predetermined value, the parking frame detector reduces a degree of contribution of the white line candidate area containing the endpoints detected by the endpoint position detector when the parking frame detector executes the detection of the parking frame.

2. The on-vehicle image processor according to claim 1, wherein the predetermined time difference is set to be shorter as the vehicle velocity measured by the vehicle behavior measurer is higher.

3. The on-vehicle image processor according to claim 1, wherein, when the vehicle moves in a predetermined distance during the predetermined time difference, the endpoint movement position predictor predicts positions of the endpoints at the time when the vehicle moves in the predetermined distance.

4. The on-vehicle image processor according to claim 1, further comprising an endpoint position oblivion judger that clears the positions of the endpoints stored in the endpoint position storage, when it is judged that the distance calculated in the distance calculator is within a predetermined value over a predetermined time.

5. The on-vehicle image processor according to claim 4, wherein the endpoint position oblivion judger clears the positions of the endpoints stored in the endpoint position storage in a shorter time as a velocity of the vehicle is within a predetermined range and the velocity of the vehicle is in a higher state.

6. The on-vehicle image processor according to claim 4, wherein the endpoint position oblivion judger clears the positions of the endpoints stored in the endpoint position storage in a shorter time as the endpoints stored in the endpoint position storage are closer to a center of the image.

7. The on-vehicle image processor according to claim 4, wherein the endpoint position oblivion judger clears the positions of the endpoints stored in the endpoint position storage in a shorter time as the distance between the endpoints calculated in the distance calculator is closer.

8. The on-vehicle image processor according to claim 4, wherein the endpoint position oblivion judger clears the positions of the endpoints stored in the endpoint position storage in a shorter time as a direction to which the white line candidate area extends is closer to a horizontal direction of the image.

9. The on-vehicle image processor according to claim 1, wherein the predetermined time difference is set to be longer for an area of the image in a lower distance from the imager than a predetermined distance than for an area of the image in a predetermined distance or more from the imager.

10. The on-vehicle image processor according to claim 1, further comprising an adhesive judger that judges a possibility that an adhesive clings to the imager,
wherein, when the possibility is determined to be high, the predetermined time difference is changed.

11. The on-vehicle image processor according to claim 1, further comprising an image convertor that converts the images imaged by the imager into overhead images of the vehicle as viewed from right above,
wherein for the area in the predetermined distance or less from the imager, the detection of the parking frame is executed by use of the converted images, and
for the area in the predetermined distance or more from the imager, the detection of the parking frame is executed by use of the images captured by the imager and not converted by the image convertor.

12. The on-vehicle image processor according to claim 1, wherein, when the distance calculated in the distance calculator is smaller than the predetermined value, the parking frame detector strictly limits a threshold value for detecting the parking frame when detecting the parking frame containing the white line candidate area having the endpoints detected in the endpoint position detector.

* * * * *